US011027638B2

(12) United States Patent
Alexandersson

(10) Patent No.: US 11,027,638 B2
(45) Date of Patent: Jun. 8, 2021

(54) LOCKING MECHANISMS FOR A FOLDABLE ARMREST FOR A SEAT OF A VEHICLE

(71) Applicant: Volvo Car Corporation, Gothenburg (SE)

(72) Inventor: Peter Alexandersson, Kungsbacka (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/699,791

(22) Filed: Dec. 2, 2019

(65) Prior Publication Data

US 2020/0101880 A1 Apr. 2, 2020

Related U.S. Application Data

(63) Continuation-in-part of application No. 16/546,419, filed on Aug. 21, 2019.

(30) Foreign Application Priority Data

Sep. 21, 2018 (EP) ..................................... 18195926

(51) Int. Cl.
 *B60N 2/75* (2018.01)
(52) U.S. Cl.
 CPC .................... *B60N 2/753* (2018.02)
(58) Field of Classification Search
 CPC ........ B60N 2/753; B60N 2/763; B60N 2/767; B60N 2/75; B60N 2/777; A47C 7/541; A47C 7/543; A47C 7/54

(Continued)

(56) References Cited

U.S. PATENT DOCUMENTS 9,616,785 B2 4/2017 Marini et al.
2008/0093908 A1* 4/2008 Cooley ................. B60N 2/753
297/411.3

(Continued)

FOREIGN PATENT DOCUMENTS

DE 9103954 U1 6/1991
DE 10029926 A1 1/2002

(Continued)

OTHER PUBLICATIONS

Apr. 25, 2019 European Search Report issue on International Application No. EP18195926.

*Primary Examiner* — Mark R Wendell
(74) *Attorney, Agent, or Firm* — Clements Bernard Walker; Christopher L. Bernard

(57) ABSTRACT

A locking mechanism for an armrest assembly for use with a seat of a vehicle, including: an arm portion adapted to be coupled to a pad portion at one end and a structure of the seat at an opposite end and to pivot from an upright use configuration to a collapsed stowed configuration adjacent to the seat; a tube structure adapted to be coupled to the structure of the seat and defining one or more circumferential notches about an exterior surface thereof; an elongate rod coupled to the opposite end of the arm portion and at least partially disposed rotatably within the tube structure; and a tab structure adapted to selectively protrude from the opposite end of the arm portion and engage one of the one or more notches of the tube structure to selectively secure the arm portion in the one or more of the upright use configuration and the collapsed stowed configuration.

17 Claims, 17 Drawing Sheets

(58) Field of Classification Search
USPC .............................. 297/411.3, 411.32, 411.33
See application file for complete search history.

(56) References Cited

U.S. PATENT DOCUMENTS

| | | | |
|---|---|---|---|
| 2008/0203803 A1* | 8/2008 | Chi ......................... | A47C 7/50 |
| | | | 297/411.37 |
| 2008/0224513 A1 | 9/2008 | Zink et al. | |
| 2011/0031785 A1* | 2/2011 | Steenson ................ | A47C 7/543 |
| | | | 297/161 |
| 2014/0159461 A1* | 6/2014 | Mochizuki ........... | B60N 2/6036 |
| | | | 297/411.32 |
| 2018/0208089 A1* | 7/2018 | Harris ................... | B60N 2/767 |
| 2019/0210499 A1* | 7/2019 | Boddenberg ........... | B60N 2/757 |
| 2020/0055432 A1* | 2/2020 | Nonaka ................. | B60N 2/767 |

FOREIGN PATENT DOCUMENTS

| | | |
|---|---|---|
| DE | 202015103426 U1 | 10/2015 |
| FR | 2923762 A1 | 5/2009 |
| JP | 2001321243 A | 11/2001 |
| JP | 2005075305 A | 3/2005 |
| JP | 4522316 B2 | 8/2010 |

* cited by examiner

LOCKING MECHANISMS FOR A FOLDABLE ARMREST FOR A SEAT OF A VEHICLE

CROSS-REFERENCE TO RELATED APPLICATIONS

The present disclosure is a continuation-in-part (CIP) of co-pending U.S. patent application Ser. No. 16/546,419, filed on Aug. 21, 2019, and entitled "ARMREST AND SEAT ARRANGEMENT FOR A VEHICLE," which claims the benefit of priority of co-pending European Patent Application No. 18195926.3, filed on Sep. 21, 2018, and entitled "ARMREST AND SEAT ARRANGEMENT FOR A VEHICLE," the contents of both of which are incorporated in full by reference herein.

TECHNICAL FIELD

The present disclosure relates generally to the automotive and seating fields. More particularly, the present disclosure relates to locking mechanisms for a foldable armrest for a seat of a vehicle.

BACKGROUND

In order to provide comfort for a user of a seat arrangement of a vehicle, the seat arrangement may be provided with an armrest offering a comfortable support for an elbow and/or a forearm of the user of the seat arrangement when the armrest is in a use position. Moreover, often the armrest may be folded or rotated away to a fold-away position, in order to allow easy access into the seat arrangement for the user.

For example, JP 2001321243 A1 discloses a seat arrangement for a vehicle. The armrest is pivotable by about 90 degrees around an axis extending in the longitudinal direction of the vehicle. However, the armrest is also rotatable another 90 degrees around an axis extending in the transverse direction of the vehicle within the backrest, such that it can be folded out of the way.

Likewise, FR 2 923 762 A1 discloses an armrest having a bearing arm carried by a support arm that includes a joint pivoting around a fixed horizontal axis for permitting the bearing arm to pass from a deployed position to a retracted position. The bearing arm is horizontal and parallel to a longitudinal direction of the vehicle in the deployed position. The axis is placed laterally under the base of a seat, such that the bearing arm and the support arm are placed under the seat in the retracted position. The horizontal axis is placed proximate to the rear of the base.

However, by mounting the armrest to or within the backrest, it follows that the armrest will accompany the backrest in any displacement thereof, e.g. when folding it forwards, which sometimes is undesirable. There is therefore a desire to provide an armrest for use in vehicles, which armrest is easy to fold away and yet is independent of the backrest, i.e. the armrest will not follow the backrest in a displacement thereof. Further, it is desirable to provide an armrest mechanism, by which movement of the armrest is enabled/disabled, that is simple to manufacture and operate, and which may be encompassed within a minimum number of cover components.

SUMMARY

The object of the present disclosure is to overcome or ameliorate at least one of the disadvantages of the prior art, or to provide a useful alternative.

The present disclosure relates, in part, to an armrest for a seat arrangement of a vehicle. The armrest is foldable between a use position and a fold-away position and includes a pad portion, an arm portion, a first hinge having a first hinge axis, and a second hinge having a second hinge axis. The pad portion is elongate along a longitudinal axis. The first hinge rotatably connects the pad portion and a first end portion of the arm portion. The second hinge is located at a second end portion of the arm portion, being opposite to the first end portion. The second hinge rotatably connects the second end portion of the arm portion to the seat arrangement. The first hinge axis and the second hinge axis have extension directions being parallel or substantially parallel to the longitudinal axis of the pad portion.

The armrest is intended to be mounted to, or to form a part of, a seat arrangement of a vehicle. The vehicle may be a car or truck, a bus, a tram, or a train. The vehicle may also be a vessel, such as a boat or ferry or an airplane. Such a vehicle is used to transport one or more passengers, which are to be seated in one or more seat arrangements as seat occupants. The armrest according to the disclosure may be mounted to an existing seat arrangement or may form part of a seat arrangement according to the disclosure, which is further described herein.

The armrest may assume the use position, offering a comfortable support for an elbow and/or a forearm of the user of the seat arrangement, and the fold-away position, making it easier to pass the seat arrangement, e.g. to access a seat of the seat arrangement or to access another seat row located behind the seat arrangement. The armrest is displaceable between these two positions. It may also assume one or more positions therebetween.

The pad portion offers a comfortable support for an elbow and/or a forearm of a user of the seat arrangement. The pad portion usually includes a padded surface, which is comfortable for the user, but it may also be unpadded. The pad portion is elongate along a longitudinal axis and thus has a relatively long extension along the longitudinal axis, typically being in the range of from 10 to 50 cm or from 20 to 40 cm, the longitudinal axis of the pad portion coinciding or substantially coinciding with a length direction of the seat arrangement and in turn with a longitudinal direction of the vehicle or vessel.

The arm portion spans the distance between the two hinges, i.e. between the first hinge and the second hinge, and thereby contributes to giving the armrest the desired height as seen in relation to a floor of the vehicle.

The first hinge is intended for rotation of the pad portion in relation to the arm portion. The first hinge may be constituted by a single continuous hinge of the type often known as a piano hinge. However, other configurations of the first hinge would also be feasible, e.g. two or more shorter hinges.

The second hinge is intended for rotation of the arm portion in relation to the rest of the seat arrangement. It is located at the opposite end portion of the arm portion as compared to the first hinge. In the use position, the first hinge is substantially vertically above the second hinge. In the fold-away position, the first hinge is substantially vertically below the second hinge.

The extension directions of the first hinge axis and the second hinge axis are parallel or substantially parallel to each other. When the armrest is mounted to a seat arrangement in the vehicle, the extension directions of the first hinge axis and the second hinge axis typically run in the length direction of the seat arrangement and thus also in the longitudinal direction of the vehicle. Further, the extension directions are typically parallel or substantially parallel to a floor of the vehicle or vessel. This differs from prior art solutions, in which the armrest is rotatable around an axis extending instead in a transverse direction of the vehicle, often located within the backrest of the seat arrangement, see e.g. the armrest of the above-mentioned JP 2001321243 A1.

The armrest according to the disclosure is easy to reach when desired and to fold away when not desired anymore. There is no need for a seat occupant to turn his or her back in order to displace the armrest, as is often the case for existing armrests having a transverse rotation axis, e.g. like the armrest disclosed in JP 2001321243 A1. The armrest according to the disclosure also makes it easier to access the seat arrangement to be seated and to pass the seat arrangement to e.g. access another seat row located behind the seat arrangement.

According to the disclosure, it is further possible to provide an armrest which offers generous support in the use position, but which is flat and out of the way in the fold-away position. In addition, the width of the backrest of the seat arrangement does not risk to be compromised by the armrest, as might be the case for a transverse rotation axis located in the backrest, cf. the armrest disclosed in JP 2001321243 A1.

Moreover, the armrest according to the disclosure remains at the same level when adjusting the backrest, e.g. when changing the inclination of the backrest. Thereby, it is possible to maintain the armrest at the same level as a fixed armrest on the other side of the seat arrangement, e.g. in or at a door or a wall of the vehicle or vessel. The armrest is directly or indirectly attachable to the seat arrangement independently of the backrest. Accordingly, the armrest is attachable to a component of the seat arrangement, which is independent of the backrest, i.e. which does not follow the backrest during a displacement thereof. The armrest may for example be attached to a recliner bracket, a seat basin, a seat frame or a seat rail included in the seat arrangement. By making the armrest independent of the backrest, it is possible to recline the backrest without affecting the angle of the armrest in relation to the floor of the vehicle. Also, forwards folding of the backrest is possible without interfering with the armrest.

The fold-away position of the armrest may be utilized to prevent a risk of a seat occupant being injured in a side impact by causing the armrest to be automatically displaced to the fold-away position, in the event of a detected or imminent side impact or a roll-over accident. Purely as an example, the armrest may be displaced by an actuator associated with a safety system of the vehicle to the fold-away position when a side force exceeds a pre-selectable level.

As an alternative or complement, the armrest may, in case of a side impact or a roll-over accident, be folded away by the seat occupant himself/herself pressing on the armrest with a force above a pre-selectable limit. Since the armrest is folded away, the risk of potential injuries to the stomach, ribs and/or spine of the seat occupant is reduced or preferably avoided.

The extension directions of the first hinge axis and the second hinge axis may differ by less than 20 degrees, preferably less than 15 degrees, more preferably less than 10 degrees, and most preferably less than 5 degrees. Purely as an example, the extension directions may be parallel, i.e. having an angular difference of 0 degrees. Purely as another example, the extension directions may be chosen such that a selected orientation of the second hinge axis may make a side surface of the pad portion of the armrest, in the fold-away position of the armrest, extend in a direction being parallel or substantially parallel to an upper surface of the seat portion. In particular, it may be desirable that the side surface of the pad portion is parallel or substantially parallel to an upper surface of the part of the seat portion being closest to the pad portion. In that case, the angular difference between the two hinge axes may be in the range of 0-10 degrees, or 2-6 degrees, e.g. about 4 or 5 degrees. This corresponds to that the upper surface of the seat portion typically is angled by about 10 degrees.

The pad portion is displaceable from the use position of the armrest, in which the pad portion has a horizontal or substantially horizontal support surface, to a substantially vertical position of the support surface used in the fold-away position of the armrest. The first hinge may be configured for a first maximum rotation angle $\alpha_{max}$ describing the rotation of the pad portion in relation to the arm portion, with $70°<\alpha_{max}<110°$, preferably $80°<\alpha_{max}<100°$, more preferably $85°<\alpha_{max}<95°$, most preferably $\alpha_{max}$ being about $90°$.

The pad portion may define a cavity, the first hinge axis being accommodated within the cavity, such that the first hinge is hidden from view for a user of the seat arrangement.

The second hinge is configured to allow rotation of the arm portion from the use position of the armrest, in which the arm portion extends vertically upwards or substantially vertically upwards from the second hinge, to the fold-away position of the armrest, in which the arm portion extends vertically downwards or substantially vertically downwards from the second hinge. The second hinge may be configured for a second maximum rotation angle $\beta_{max}$ defining the rotation of the arm portion in relation to the rest of the seat arrangement, with $150°<\beta_{max}<190°$, preferably $165°<\beta_{max}<185°$, more preferably $170°<\beta_{max}\leq180°$.

The first hinge and the second hinge may interspaced by a smallest distance being at least 5 cm, preferably at least 7 cm, more preferably at least 10 cm. This distance defines the height of the arm portion when the armrest in in the use position.

The armrest preferably includes a locking mechanism configured to secure the armrest in at least one of the use position and the fold-away position, preferably in both. The locking mechanism may also be utilized to lock the pad portion in the use position of the armrest, i.e. to retain the pad portion horizontally or substantially horizontally. As an alternative or a complement, an additional locking mechanism may be provided for the pad portion, e.g. a magnetic coupling.

The locking mechanism may include a first portion located at the pad portion of the armrest, a second portion operating at the second hinge and a linkage system connecting the first and second portions. By utilizing such a locking mechanism, a rotation of the pad portion about the first hinge, made by e.g. a user of the seat arrangement, may be utilized to influence a possible movement at the second hinge.

The first portion of the locking mechanism may be operated by rotating the pad portion by an angle $\alpha$ around the first hinge. Accordingly, the support surface of the pad portion is moved to an essentially vertical position facing inwards, i.e. towards a body of the user of the seat arrangement. The pad portion may be rotated in two steps, with the last step of the rotation providing a movement which is used to unlock the locking mechanism. The first step of the rotation may encompass an angle in the range of from 5° to 85°, preferably from 30° to 80°, more preferably from 50° to 75°, most preferably from 60° to 70°. The second step may then encompass the remaining angle portion up to the first maximum rotation angle $\alpha_{max}$.

The above-described locking mechanism represents one way of locking and unlocking the armrest. Alternatively, a release button or a pull strap may be provided for locking and unlocking the armrest. As a further alternative, the armrest may be biased towards the use position and the fold-away position, respectively. In that case, there would be no firm locked state of the locking mechanism. Instead, an increased force would be used to displace the armrest from the use position and the fold-away position, respectively. It would also be possible to perform the transition of the armrest between the use position and the fold-away position electrically.

In one exemplary embodiment, the present disclosure provides an armrest assembly for use with a seat of a vehicle, the armrest assembly including: a pad portion adapted to support a forearm of a user when the armrest assembly is disposed in an upright use configuration adjacent to the seat; an arm portion coupled to the pad portion at one end and a structure of the seat at an opposite end and adapted to pivot from the upright use configuration to a collapsed stowed configuration adjacent to the seat along a hinge with the structure of the seat; and a locking mechanism coupled between the arm portion and the structure of the seat and adapted to selectively prevent pivoting of the arm portion and secure the arm portion in one or more of the upright use configuration and the collapsed stowed configuration adjacent to the seat; wherein the locking mechanism includes: a tube structure coupled to the structure of the seat and defining one or more circumferential notches about an exterior surface thereof; an elongate rod coupled to the opposite end of the arm portion and at least partially disposed rotatably within the tube structure; and a tab structure adapted to selectively protrude from the opposite end of the arm portion and engage one of the one or more notches of the tube structure to selectively secure the arm portion in the one or more of the upright use configuration and the collapsed stowed configuration adjacent to the seat. The structure of the seat includes one or more of a hinge bracket and a recliner bracket adapted to be coupled to or integrally formed with the seat. The locking mechanism further includes one or more bushings disposed concentrically between the tube structure and the elongate rod and adapted to facilitate relative rotation of the elongate rod within the tube structure. The locking mechanism further includes a strut member coupled to the tab structure and adapted to be selectively translated within the arm portion, thereby selectively extending the tab structure from and/or withdrawing the tab structure into the opposite end of the arm portion and the one or more circumferential notches. The strut member is coupled to the pad portion at the one end of the arm portion and adapted to be selectively translated within the arm portion via selective pivoting of the pad portion with respect to the arm portion along an intervening hinge. The tab structure is biased to protrude from the opposite end of the arm portion by a spring member disposed within or coupled to the arm portion. The one or more circumferential notches are disposed about the exterior surface of a central portion of the tube structure. The tube structure defines one or more partially-circumferential cut-outs through which one or more connecting structures couple the arm portion to the elongate rod through the tube structure.

In another exemplary embodiment, the present disclosure provides a locking mechanism for an armrest assembly for use with a seat of a vehicle, the locking mechanism including: an arm portion adapted to be coupled to a pad portion at one end and a structure of the seat at an opposite end and to pivot from an upright use configuration to a collapsed stowed configuration adjacent to the seat along a hinge with the structure of the seat; a tube structure adapted to be coupled to the structure of the seat and defining one or more circumferential notches about an exterior surface thereof; an elongate rod coupled to the opposite end of the arm portion and at least partially disposed rotatably within the tube structure; and a tab structure adapted to selectively protrude from the opposite end of the arm portion and engage one of the one or more notches of the tube structure to selectively secure the arm portion in the one or more of the upright use configuration and the collapsed stowed configuration adjacent to the seat; wherein the locking mechanism is adapted to selectively prevent pivoting of the armrest assembly with respect to the structure of the seat along the hinge and secure the armrest assembly in one or more of the upright use configuration and the collapsed stowed configuration adjacent to the seat. The pad portion is adapted to support a forearm of a user when the armrest assembly is disposed in the upright use configuration adjacent to the seat. The locking mechanism further includes a hinge bracket coupled to the tube structure and adapted to be coupled to a recliner bracket adapted to be coupled to or integrally formed with the seat. The locking mechanism further includes one or more bushings disposed concentrically between the tube structure and the elongate rod and adapted to facilitate relative rotation of the elongate rod within the tube structure. The locking mechanism further includes a strut member coupled to the tab structure and adapted to be selectively translated within the arm portion, thereby selectively extending the tab structure from and/or withdrawing the tab structure into the opposite end of the arm portion and the one or more circumferential notches. The strut member is adapted to be coupled to the pad portion at the one end of the arm portion and selectively translated within the arm portion via selective pivoting of the pad portion with respect to the arm portion along an intervening hinge. The tab structure is biased to protrude from the opposite end of the arm portion by a spring member disposed within or coupled to the arm portion. The one or more circumferential notches are disposed about the exterior surface of a central portion of the tube structure. The tube structure defines one or more partially-circumferential cut-outs through which one or more connecting structures couple the arm portion to the elongate rod through the tube structure.

The armrest may further include a hinge bracket, the second hinge rotatably connecting the second end portion of the arm portion to the hinge bracket, the hinge bracket being configured for attachment to the seat arrangement. The hinge bracket provides attachment for the second hinge. By using the hinge bracket, the armrest according to the disclosure may easily be mounted to an existing vehicular seat by attaching the hinge bracket to a portion of the seat, e.g. to a recliner bracket, a seat basin, a seat frame, or a seat rail utilized in the seat arrangement.

The present disclosure also relates to a seat arrangement for a vehicle, including a seat and at least one armrest according to the disclosure. The seat includes a seat portion and a backrest. The backrest may have an adjustable inclination and/or be forwards foldable.

The armrest is directly or indirectly attachable to the seat independently of the backrest. The armrest may for example be attached to a recliner bracket, a seat basin, a seat frame, or a seat rail included in the seat arrangement. By making the armrest independent of the backrest, it is possible to recline the backrest without affecting the angle of the armrest in relation to the floor of the vehicle. Also, forwards folding of the backrest is possible without interfering with the armrest. Further, the example components of the seat arrangement mentioned above for attachment have in common that they allow the armrest to follow any longitudinal adjustment of the seat in relation to the floor.

The extension directions of the first hinge axis and the second hinge axis may be substantially in a length direction of the seat arrangement or in the length direction of the seat arrangement, which typically corresponds to the longitudinal direction of the vehicle when mounted in the vehicle.

The pad portion of the armrest may, in the fold-away position, extend in a direction being parallel or substantially parallel to a floor attachment portion included in the seat arrangement, e.g. a seat rail.

A side surface of the pad portion of the armrest may, in the fold-away position of the armrest, extend in a direction being parallel or substantially parallel to an upper surface of the seat portion, preferably aligned with the upper surface thereof. Thereby, the armrest will form a continuation of the seat portion. In particular, it may be desirable that the side surface of the pad portion is parallel or substantially parallel to an upper surface of the part of the seat portion being closest to the pad portion.

The backrest may be forwards foldable to a folded position, e.g. by the backrest being pivotable around a bolt in the recliner bracket, by an angle in the range of 20-60 degrees, or 30-50 degrees, e.g. about 40 degrees, wherein the pad portion is shaped such that when the armrest is in the fold-away position and the backrest is in the folded position, a lowest portion of the pad portion is at a vertical level being higher than or equal to a lowest part of the seat arrangement. The extension of the pad portion may be adapted, e.g. shortened to avoid contact with the floor. As a complement or an alternative, an outer corner of the pad portion may be chamfered. Thereby, the backrest can be folded without the pad portion being hindered by the floor of the vehicle or vessel, due to the pad portion being shaped such that it does not project lower than the lowest part of the seat arrangement. This provides easier access to an additional seat arrangement being located behind the seat arrangement.

The present disclosure further relates to a vehicle or vessel including a seat arrangement according to the disclosure.

BRIEF DESCRIPTION OF THE DRAWINGS

The present disclosure will hereinafter be further explained by means of non-limiting examples with reference to the appended drawings, wherein.

It should be noted that the appended drawings are schematic and that individual components are not necessarily drawn to scale and that the dimensions of some features of the present disclosure may be exaggerated for the sake of clarity.

DESCRIPTION OF EMBODIMENTS

The disclosure will, in the following, be exemplified by embodiments. It should however be realized that the embodiments are included in order to explain principles of the disclosure and not to limit the scope of the disclosure, as defined by the appended claims. A feature from one embodiment may be combined with one or more features of any other embodiment.

Figure 1:
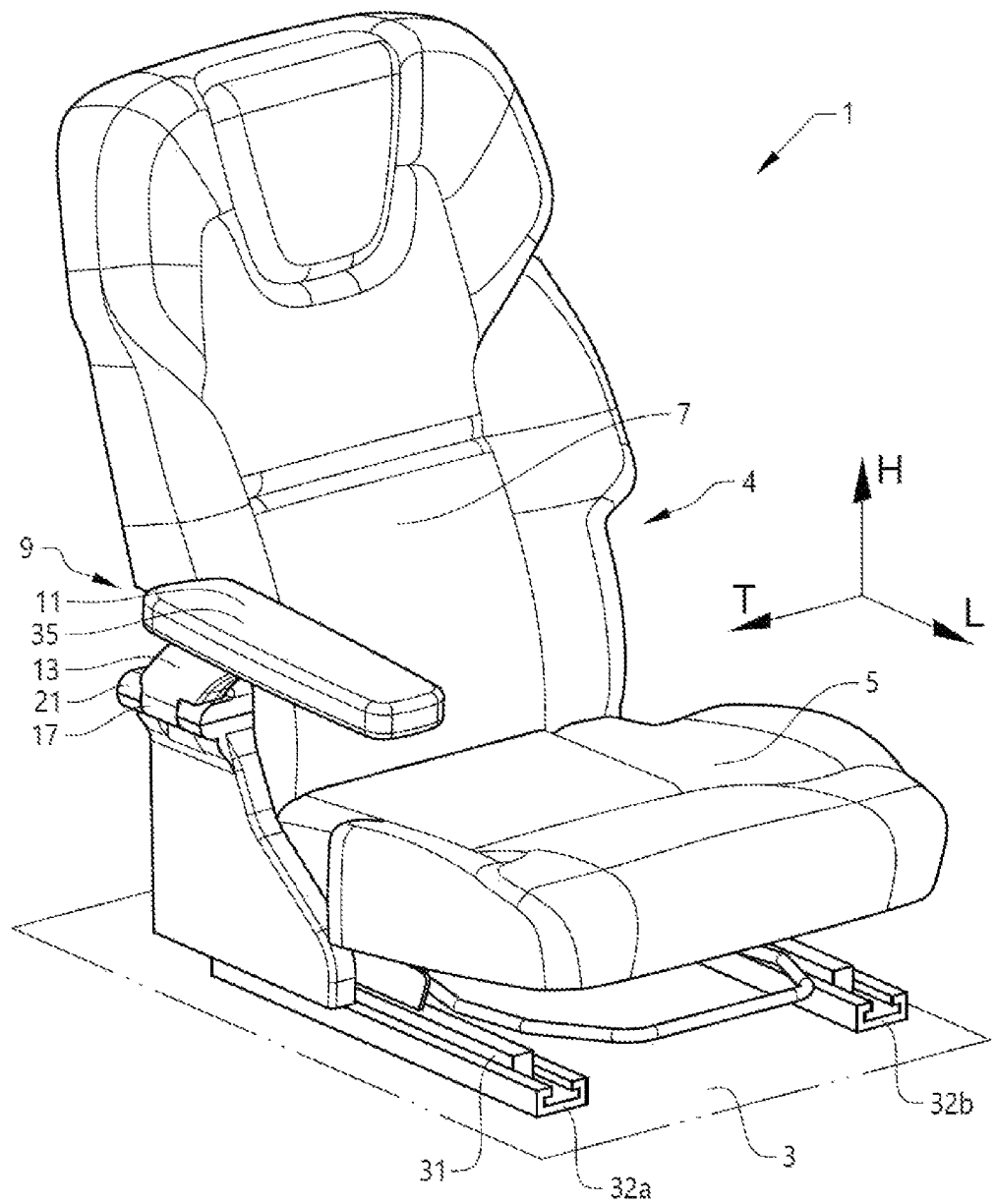
FIG. 1 illustrates a seat arrangement with an armrest according to the disclosure in a use position.
Figure 2:
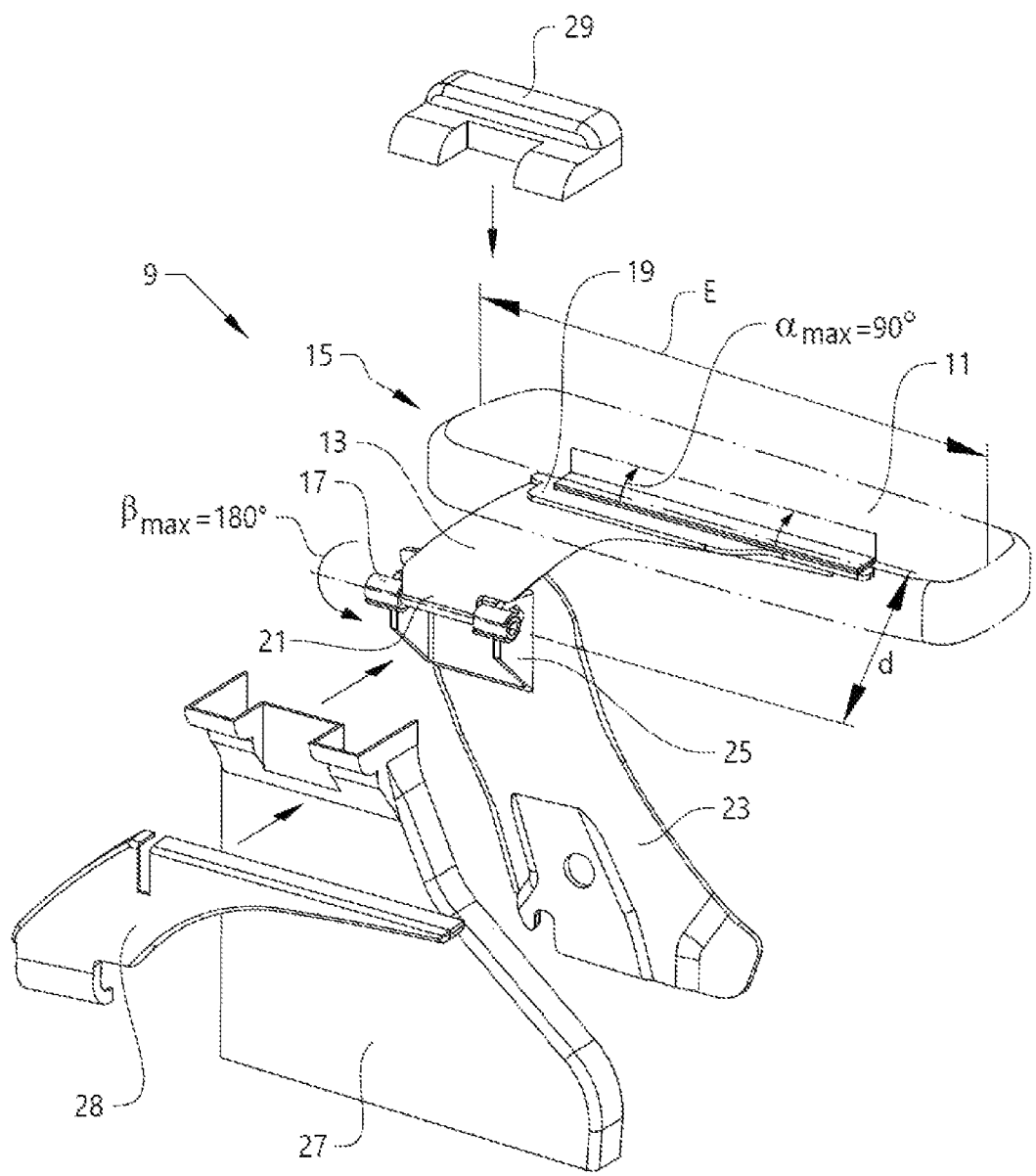
FIG. 2 is an exploded view of the armrest.
Figure 3:
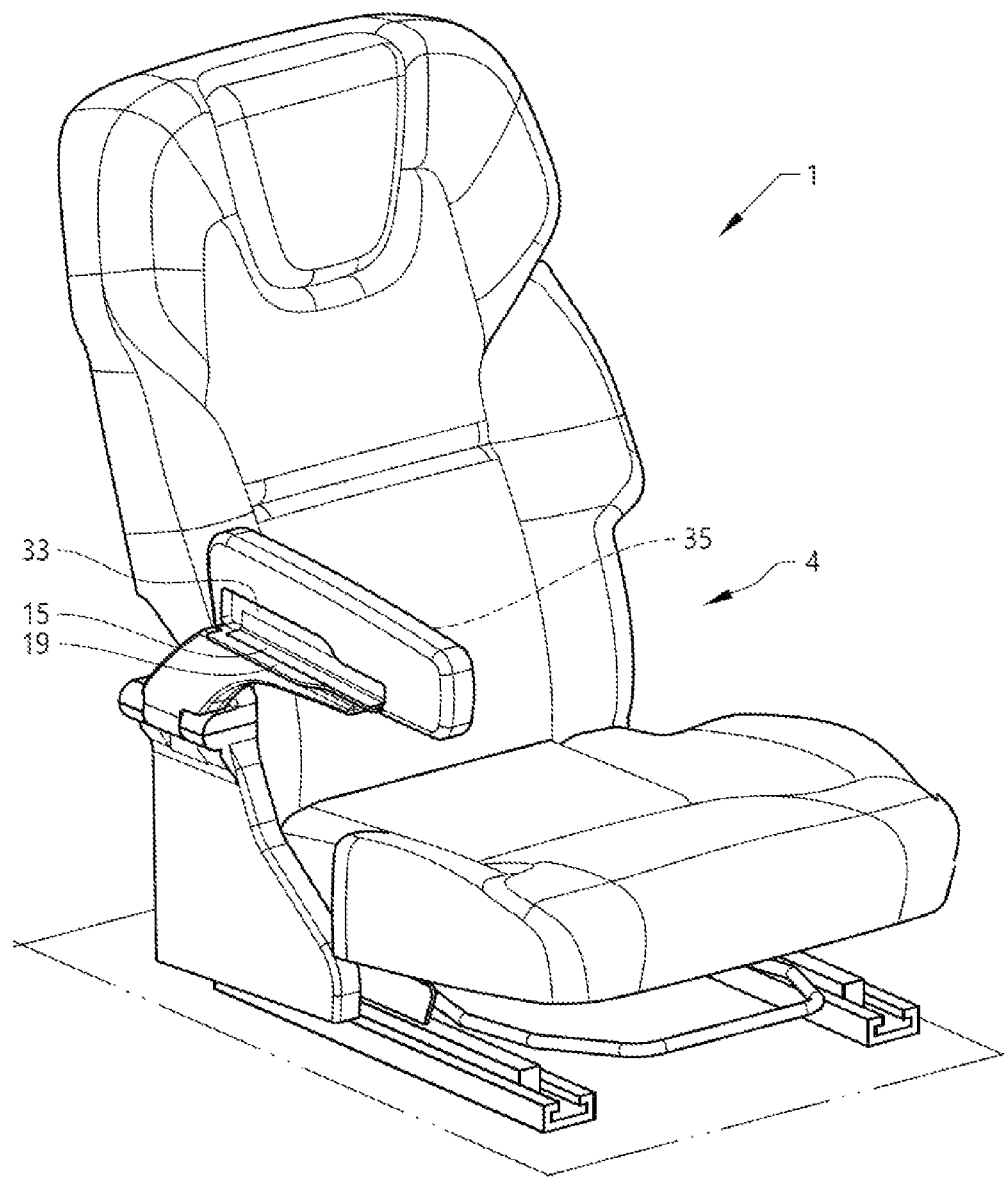
FIG. 3 illustrates the seat arrangement with the armrest having a rotated pad portion.
Figure 4:
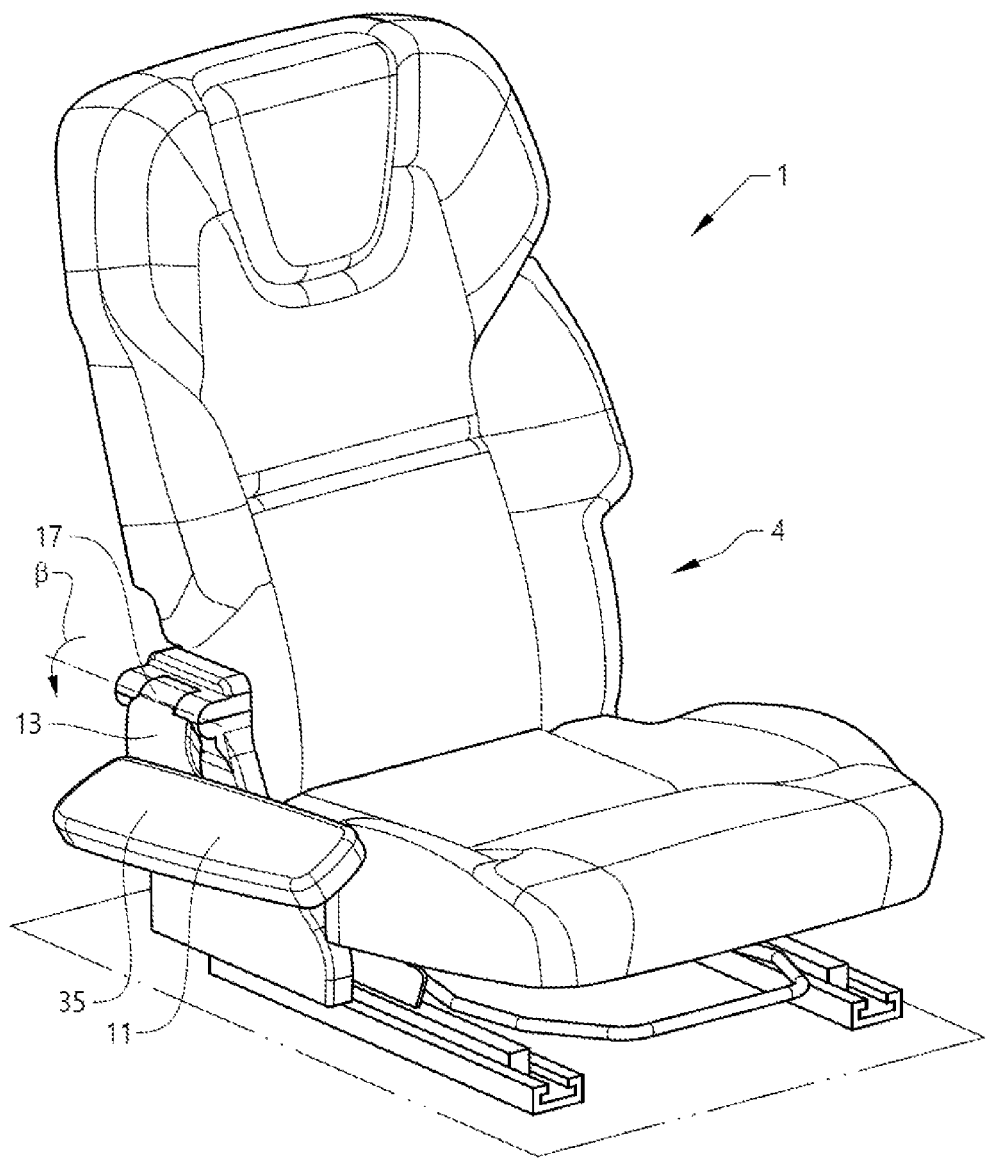
FIG. 4 illustrates the seat arrangement with the armrest during transition to a fold-away position.
Figure 5:
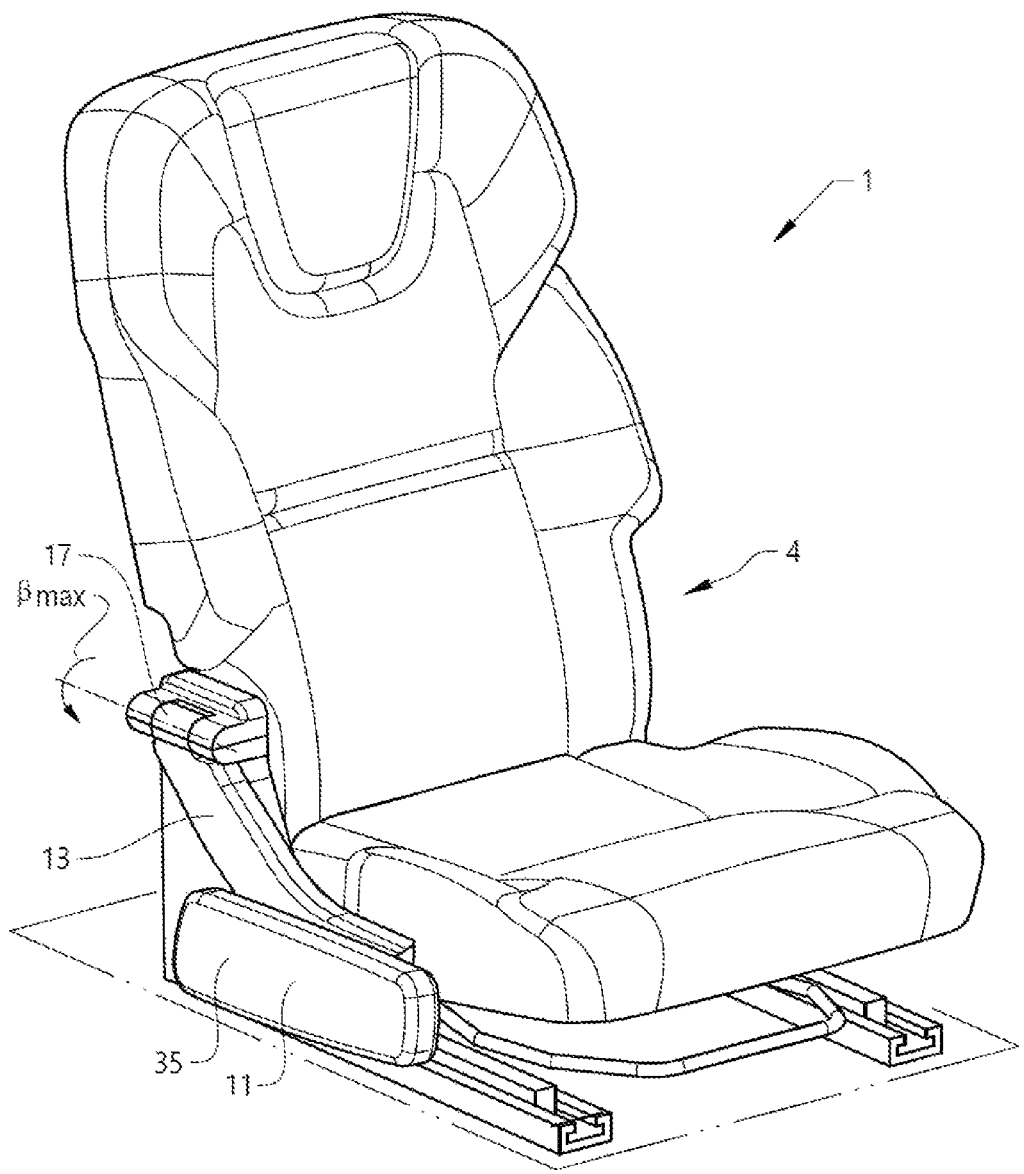
FIG. 5 illustrates the seat arrangement with the armrest in the fold-away position.

FIGS. 1-5 illustrate a vehicular seat arrangement 1 according to the disclosure when mounted in a vehicle, whereof only a floor 3 is indicated. The seat arrangement 1 includes a vehicular seat 4 having a seat portion 5, intended to receive a bottom of a user of the seat arrangement 1, and a backrest 7, see FIG. 1. The seat arrangement 1 further includes an armrest 9 according to a first embodiment of the disclosure. FIG. 2 shows an exploded view illustrating details of the armrest 9. The armrest 9 may assume a use position, as in FIG. 1, offering a comfortable support for an elbow and/or a forearm of the user of the seat arrangement 1, and a fold-away position, as illustrated in FIG. 5 and further described below, making it easier to access the seat 4 or to pass the seat arrangement 1 to e.g. access another seat row located behind the seat arrangement 1. The armrest 9 is displaceable between these two positions as is further described below with the help of FIGS. 3 and 4 showing various positions assumed during the displacement.

The armrest 9 includes a pad portion 11, an arm portion 13, a first hinge 15, hidden from view within the pad portion 11 in FIG. 1, and a second hinge 17. The first hinge 15 rotatably connects the pad portion 11 and a first end portion 19 of the arm portion 13, see FIG. 2. The second hinge 17 rotatably connects a second end portion 21 of the arm portion 13, being opposite to the first end portion 19, to a recliner bracket 23 via a hinge bracket 25, whereof the recliner bracket 23 and the hinge bracket 25 are hidden behind covers 27, 28, 29 in FIG. 1 but visible in the exploded view of FIG. 2. The hinge bracket 25 is attached to the recliner bracket 23 and provides attachment for the second hinge 17. The recliner bracket 23 forms part of the seat 4. By using a hinge bracket 25, the armrest 9 according to the disclosure may easily be mounted to an existing vehicular seat by attaching the hinge bracket 25 to a portion of the seat, e.g. to the recliner bracket 23 as in the illustrated embodiment. The first hinge 15 and the second hinge 17 are interspaced by a smallest distance d, see FIG. 2, being at least 5 cm, preferably at least 10 cm, more preferably at least 15 cm. When the armrest 9 is in the use position, as illustrated in FIG. 1, the smallest distance d represents the vertical distance as seen in a height direction H of the vehicle.

In the illustrated embodiment, the first hinge 15 and the second hinge 17 have extension directions which are parallel to each other and also to a surface of the floor 3 of the vehicle. The extension directions are thereby parallel to a lower surface of a floor attachment portion 31 included in the seat 4, in this embodiment attached to rails 32a, 32b mounted to the floor 3, such that the seat 4 may be adjusted in a longitudinal direction of the vehicle. Further, the extension directions of the first hinge 15 and the second hinge 17 run in a length direction L of the seat arrangement 1 and thus also in the longitudinal direction of the vehicle.

In the illustrated embodiment, the first hinge 15 is accommodated in a cavity 33 of the pad portion 11, see FIG. 3, such that the first hinge 15 is hidden from view in the pad portion 11 during normal use. In the illustrated embodiment, the first hinge 15 is constituted by a single continuous hinge of the type known as a piano hinge. This is appropriate considering that the pad portion 11 is elongate along a longitudinal axis and thus has a relatively long extension E along the longitudinal axis, see FIG. 2, typically being in the range of from 10 to 50 cm or from 20 to 40 cm, the longitudinal axis of the pad portion 11 coinciding or substantially coinciding with the length direction L of the seat arrangement 1. However, other configurations of the first hinge 15 are also feasible, e.g. two or more shorter hinges. Further, the extension directions of the first hinge 15 and the second hinge 17 are parallel or substantially parallel to the longitudinal axis of the pad portion 11.

The first hinge 15 is configured to allow rotation of the pad portion 11 by a first maximum rotation angle $\alpha_{max}$ being about 90 degrees, from the use position of the armrest 9, in which the pad portion 11 has a horizontal or substantially horizontal support surface 35, see FIG. 1, to a substantially vertical position of the support surface 35 used in the fold-away position of the armrest 9, see FIG. 5. A locking mechanism is provided in order to secure the armrest 9 in the use position and the fold-away position. The locking mechanism 37 is further described below in conjunction with FIGS. 9-13.

The second hinge 17 is configured to allow rotation of the arm portion 13 by a second maximum rotation angle $\beta_{max}$ being about 180 degrees, from the use position of the armrest 9, in which the arm portion 13 extends vertically upwards or substantially vertically upwards from the second hinge 17, see FIGS. 1 and 2, to the fold-away position of the armrest 9, in which the arm portion 13 extends vertically downwards or substantially vertically downwards from the second hinge 17, see FIG. 5.

FIGS. 1 and 3-5 illustrate a transition from the use position, see FIG. 1, to the fold-away position of the armrest 9, see FIG. 5. Of course, the armrest 9 may also be displaced in the opposite way, i.e. from the fold-away position to the use position.

In the use position, as seen in FIG. 1, the support surface 35 of the pad portion 11 has a horizontal or substantially horizontal surface offering a comfortable support for the elbow and/or forearm of the user of the seat arrangement 1.

When the armrest 9 is to be folded away, the pad portion 11 is rotated by an angle $\alpha$ around the first hinge 15, in the illustrated embodiment being the first maximum rotation angle $\alpha_{max}$ being about 90°. Accordingly, the support surface 35 is moved to an essentially vertical position facing inwards, i.e. towards a body of the user of the seat arrangement 1, see FIG. 3. As further described below in conjunction with FIGS. 9-13, the pad portion 11 may be rotated in two steps, with the last step of the rotation, e.g. from 65° to 90°, providing a movement which is used to unlock the locking mechanism.

In the next step of the transition, the arm portion 13 is rotated around the second hinge 17, see FIG. 4, to the fold-away position of the armrest 9, see FIG. 5. In this position of the armrest 9, the support surface 35 of the pad portion 11 faces outwards from the seat 4, i.e. away from the user of the seat arrangement 1, making it easier to pass the seat arrangement 1, e.g. in order to reach another seat row being located behind the illustrated seat 4. Since the first hinge 15 is accommodated within the cavity 33, the support surface 35 has a flat and continuous surface in the outwards-facing direction, which surface is the same as used for support of the elbow and/or forearm, cf. FIG. 1.

The fold-away position of the armrest 9 may be utilized to prevent a risk of a seat occupant being injured in a side impact by causing the armrest 9 to be automatically displaced to the fold-away position, in the event of a detected or imminent side impact or a roll-over accident. Purely as an example, the armrest 9 may be displaced by an actuator associated with a safety system of the vehicle to the fold-away position when the side force exceeds a pre-selectable level.

As an alternative or complement, the armrest 9 may, in case of a side impact or a roll-over accident, be folded away by the seat occupant himself/herself pressing on the armrest 9 with a force above a pre-selectable limit. Since the armrest 9 is folded away, the risk of potential injuries to the stomach, ribs and/or spine of the seat occupant is reduced or preferably avoided.

Compared to the use position, in the fold-away position of the armrest 9, the pad portion 11 has been rotated by a second rotation angle $\beta$, which may be the same as the second maximum rotation angle $\beta_{max}$ being about 180°.

Figure 6:
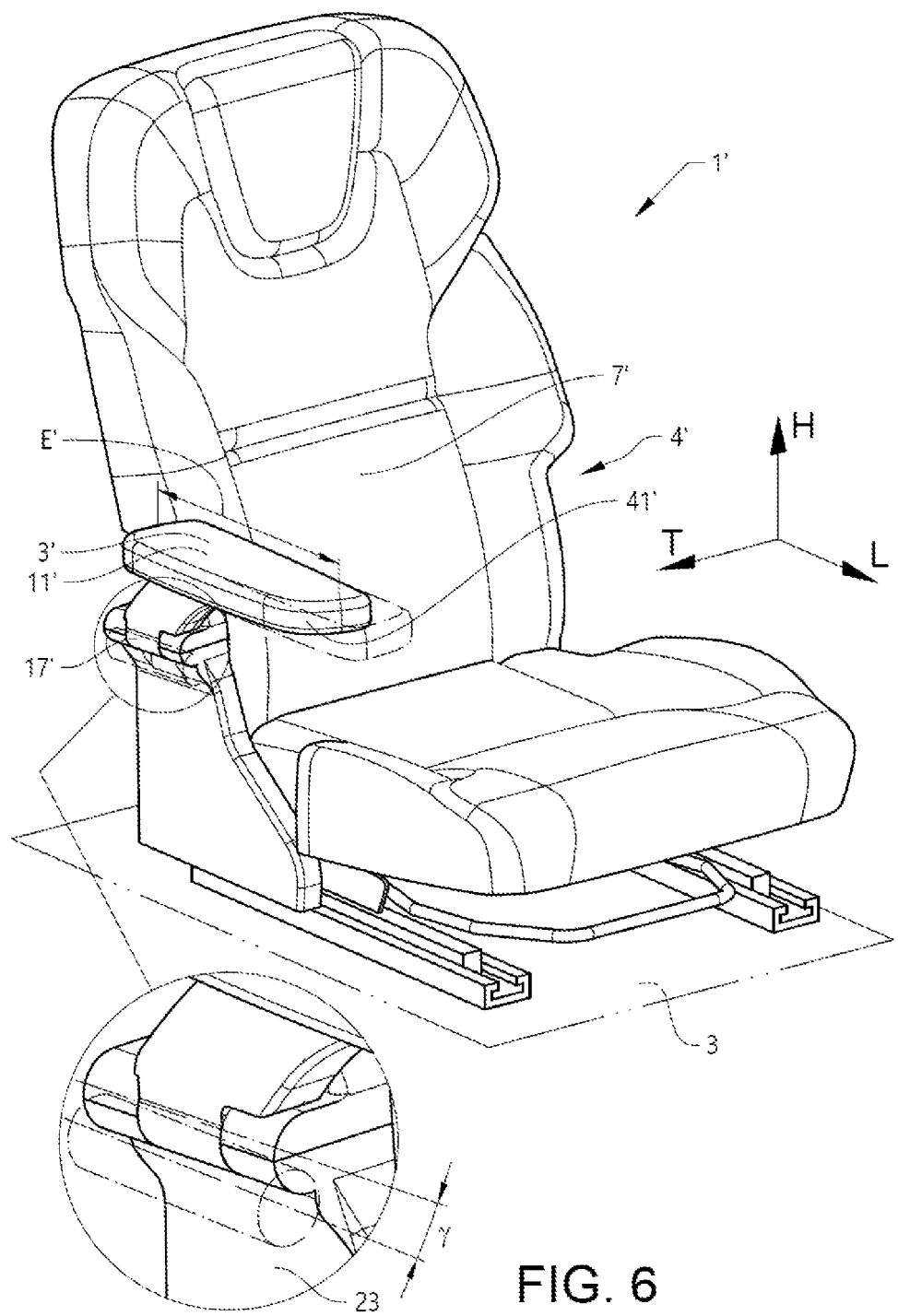
FIG. 6 illustrates another seat arrangement with an armrest according to the disclosure in a use position.
Figure 7:
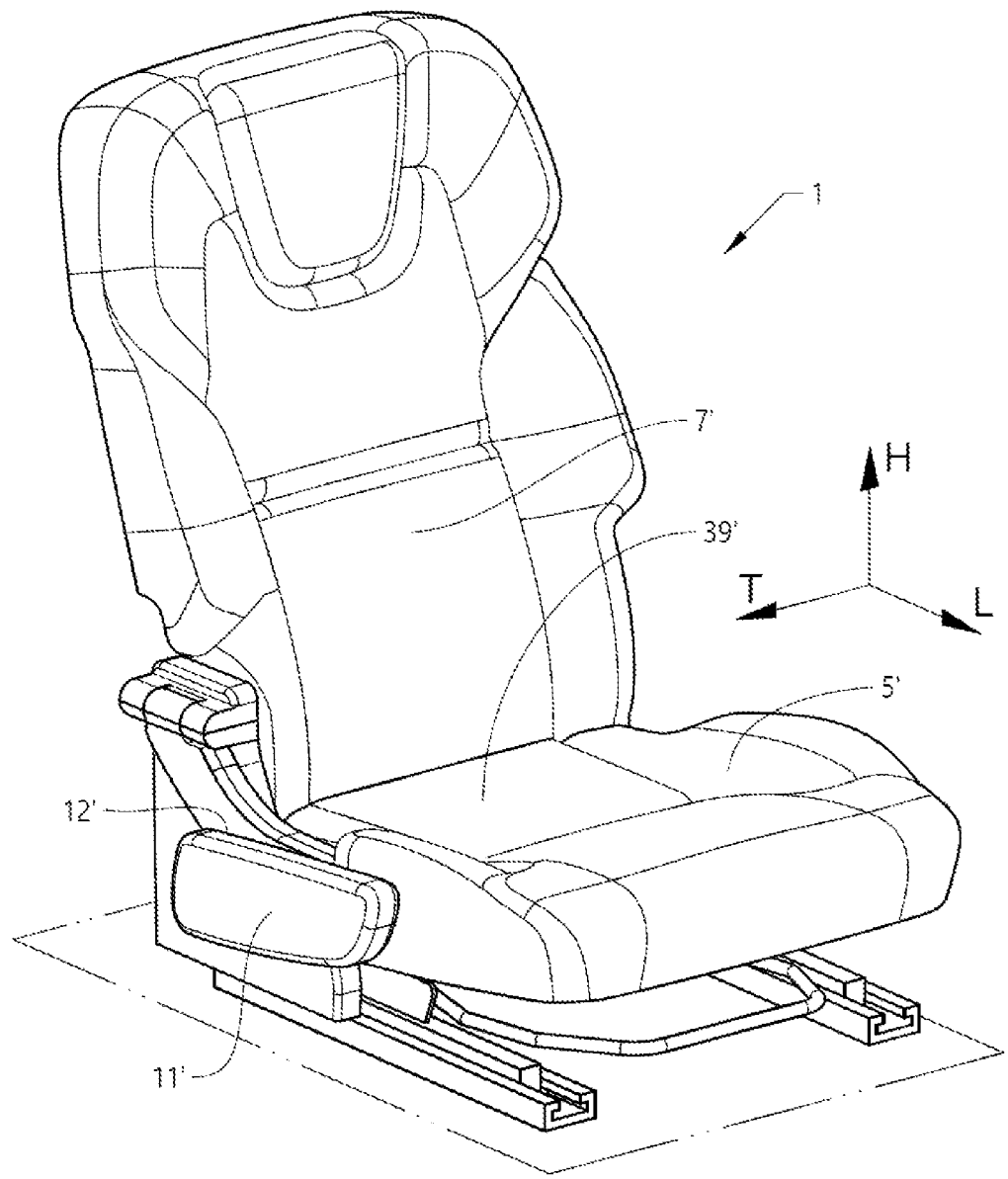
FIG. 7 illustrates the seat arrangement with the armrest in the fold-away position.
Figure 8:
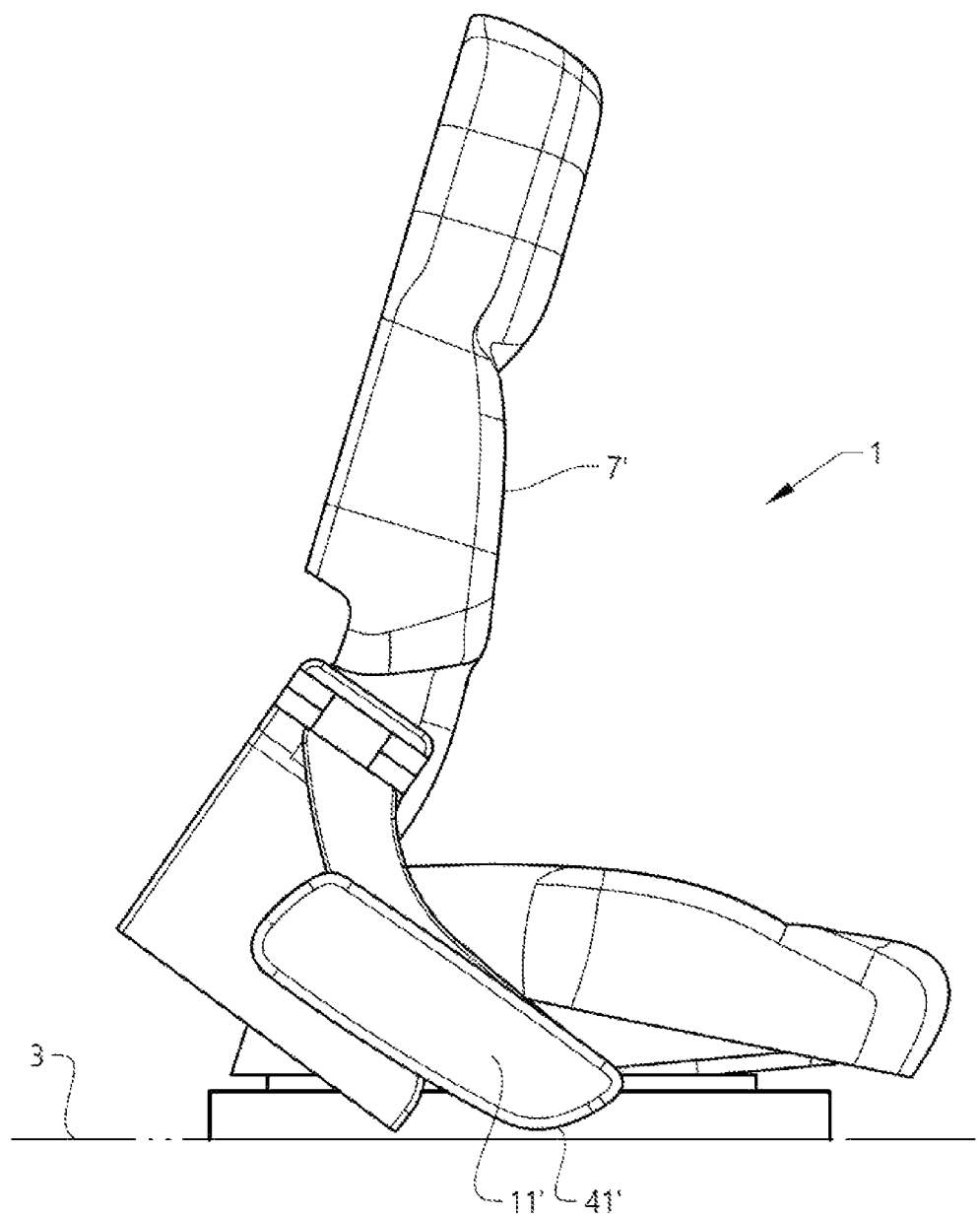
FIG. 8 illustrates the seat arrangement 7 when the seat is folded forwards.

FIGS. 6-8 illustrate a second embodiment of the armrest 9' according to the disclosure embodied in another seat arrangement 1' according to the disclosure. Most components of the seat 4' of the other seat arrangement 1' and of the armrest 9' are similar to the seat 4 and the armrest 9 of the seat arrangement 1 described above with reference to FIGS. 1-5 and will not be described again.

One differentiating feature when comparing the two embodiments is that the second hinge 17' is located higher up on the recliner bracket 23 than that of the first embodiment as seen in relation to the floor 3, the location of which is indicated by dashed lines in the detailed view of FIG. 6. Further, the second hinge 17' is angled by a slight angle $\gamma$ in relation to the second hinge 17 of the first embodiment and thus also to the floor 3. The angle $\gamma$ is between 0 and 10°, typically between 2° and 6°, herein illustrated as 4°. As a consequence of the slight angle $\gamma$, in the fold-away position of the armrest 9', a side surface 12' of the pad portion 11' is located aligned with an upper surface 39' of the seat portion 5' of the seat arrangement 1', see FIG. 7.

Other differentiating features are that the extension E' of the pad portion 11' in the length direction L is less than for the first embodiment, indicated by a dashed line in FIG. 6 and that the pad portion 11' is shaped having a chamfered outer corner 41', see FIG. 6.

Utilizing one or more of these differentiating features may be advantageous in case the seat arrangement 1' is provided with a backrest 7' which is forwards foldable, e.g. by the backrest 7' being pivotable around a bolt in the recliner bracket 23, by an angle in the range of 20-60 degrees, or 30-50 degrees, e.g. about 40 degrees, see FIG. 8. Thereby, the backrest 7' can be folded without the pad portion 11' being hindered by the floor 3, due to the pad portion 11 being shaped such that it does not project lower than a lowest part of the seat arrangement 1'. Hence, a lowest portion of the pad portion 11' is at a vertical level being higher than or equal to a lowest part of the seat arrangement 1'. This provides easier access to an additional seat arrangement being located behind the illustrated seat arrangement 1'.

These differentiating features may be used in combination, as in the illustrated second embodiment of FIGS. 6-8, or may be used separately.

As mentioned above, a locking mechanism 37 is provided to be able to secure the armrest 9 in the use position and the fold-away position. One embodiment of the locking mechanism 37 is described below with reference to FIGS. 9-13.

Figure 9:
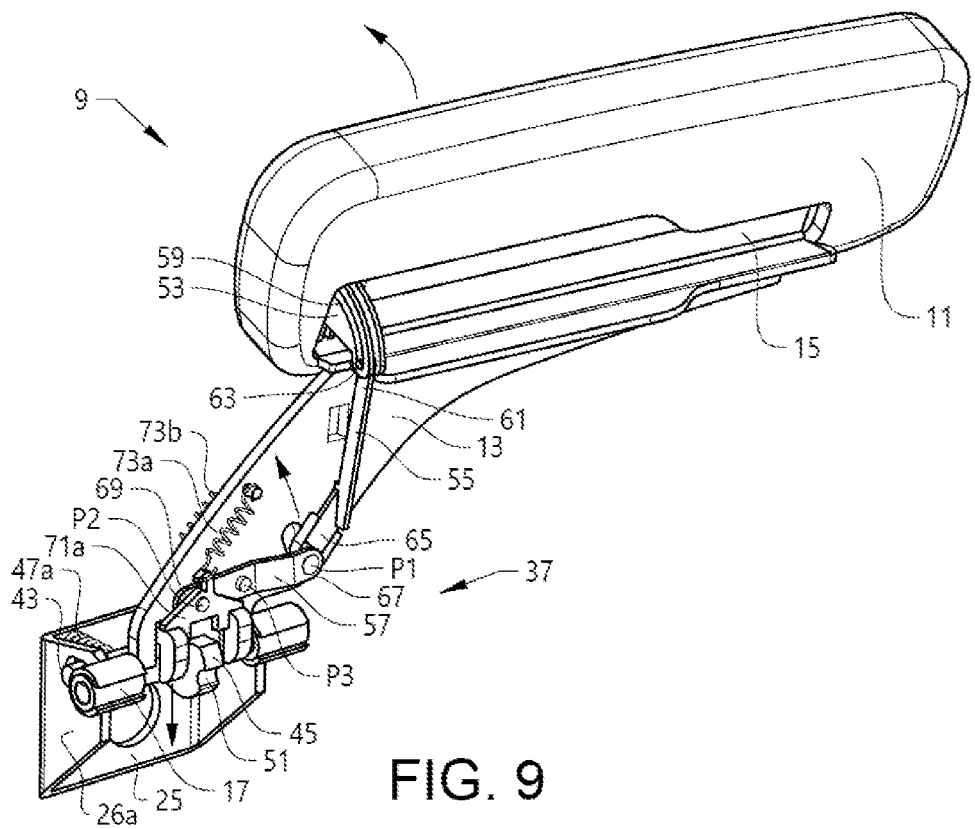
FIG. 9 illustrates the armrest including a locking mechanism, with the pad portion in an intermediate position and the locking mechanism in a locked state.

In this exemplary embodiment, the locking mechanism 37 extends between the pad portion 11, along the arm portion 13 to the second hinge 17, see FIG. 9. The locking mechanism 37 may assume a locked state, in which the arm portion 13 is directed upwards or downwards, and an open state, in which the arm portion 13 is free to rotate. When the armrest 13 is in the use position or in the fold-away position, the second hinge 17 is held in the locked state.

Figure 10:
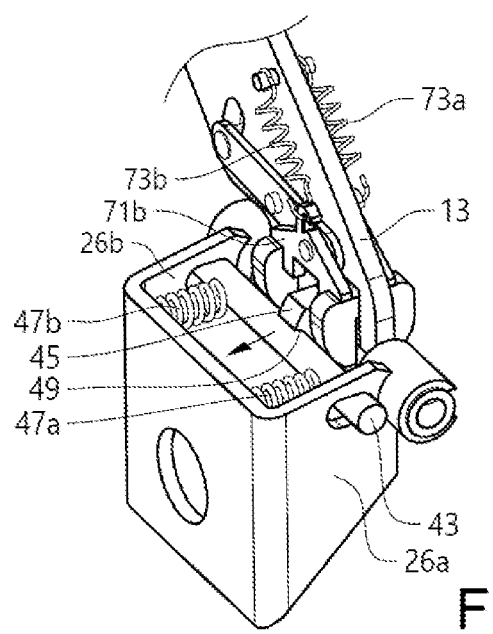
FIG. 10 illustrates a detailed view of the armrest from another perspective.
Figure 11:
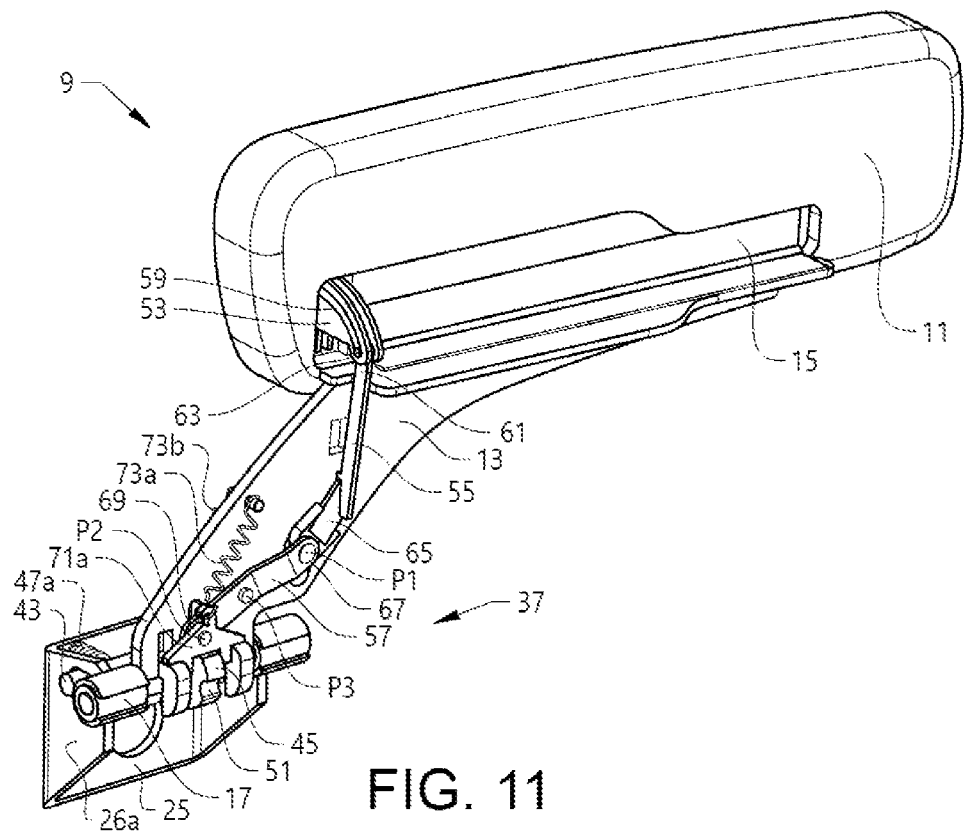
FIG. 11 illustrates the armrest with the locking mechanism in an unlocked state.
Figure 12:
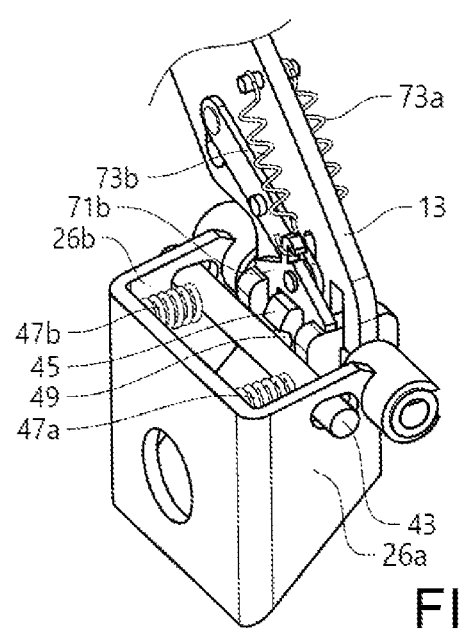
FIG. 12 illustrates a detailed view of the armrest from another perspective.

The locking mechanism 37 includes a locking pin 43 mounted between a pair of flanges 26a, 26b of the hinge bracket 25, see FIG. 10. The locking pin 43 is adapted to cooperate with a locking member 45, which is located on the second end portion 21 of the arm portion 13. The locking pin 43 is biased towards the locking member 45 by means of a first biasing means, depicted as a pair of springs 47a, 47b. The locking member 45 includes a first indentation 49, facing the hinge bracket 25 and thus hidden from view in FIG. 9 but seen in FIG. 10, and a second indentation 51, seen in FIG. 9 but hidden from view in FIG. 10. The first indentation 49 and the second indentation 51 are located at opposite sides of the locking member 45 and are configured to be able to receive the locking pin 43. When the locking pin 43 is located in the first indentation 49, this corresponds to the second hinge 17 being locked with the arm portion 13 directed upwards. When the locking pin 43 is located in the second indentation 51, this corresponds to the second hinge 17 being locked with the arm portion 13 directed downwards. The outer surface profile of the locking member 45 between the first and second indentations 49, 51 is rounded, see FIG. 9, such that the locking member 45 may rotate together with the arm portion 13, as described below, even though the locking pin 43 presses against the locking member 45. The locking pin 43 thereby remains in contact with the rounded profile facing the locking pin 43 during the rotation.

The locking mechanism 37 further includes a bracket portion 53, a first link arm 55, and a second link arm 57. The bracket portion 53 is attached to the pad portion 11. The bracket portion 53 includes an arcuate guide, exemplified as a slot 59. Hence, the bracket portion 53 forms a first portion of the locking mechanism 37 attached to the pad portion 11. A first end 61 of the first link arm 55 is slidably arranged in relation to the bracket portion 53. In the illustrated embodiment, a protruding pin 63 at the first end 61 of the first link arm 55 is configured to slide in the arcuate slot 59. The arcuate shape of the slot 59 is adapted to the rotation of the pad portion 11, such that the first end 61 can slide in the slot 59 when the pad portion 11 is rotated about the first hinge 15.

A second opposite end 65 of the first link arm 55 is pivotally connected at a first pivot axis P1 to a first end 67 of the second link arm 57. A second opposite end 69 of the second link arm 57 is connected to an unlock slider 71a by a second pivot axis P2, which is configured to allow a pivoting/sliding movement, such that a rotation of the second link arm 57 is transferable to a straight movement of the unlock slider 71a. Hence, there is an elongated hole in the second link arm 57 allowing this movement. A central region of the second link arm 57 is pivotally connected to the arm portion 13 at a third pivot axis P3. A second biasing means, depicted as a spring 73a, is attached to the arm portion 13 and strives to hold the unlock slider 71a in a position in which the unlock slider 71a does not influence the locking pin 43, e.g. by being out of contact therewith. On the other side of the arm portion 13, a second spring 73b biases a second unlock slider 71b which is also connected to the second pivot axis P2 in a corresponding way. Hence, the unlock slider 71a and the second unlock slider 71b are configured to move in synchrony. Although it is sufficient to have only one spring and one unlock slider, here it is preferred to have two for better balance.

The locking pin 43 and the locking member 45 form a second portion of the locking mechanism 37 located at the second hinge 17, with the first link arm 55, the second link arm 57 and the unlock sliders 71a, 71b forming a linkage system connecting the first and second portions of the locking mechanism 37. By utilizing a locking mechanism 37 as described herein, a rotation of the pad portion 11 about the first hinge 15, made by e.g. a user of the seat arrangement 1, will influence a possible movement at the second hinge 17.

When the armrest 11 is in the use position, as in FIG. 1, the locking mechanism 37 is in the locked state.

FIG. 9 illustrates the pad portion 11 being rotated to an intermediate position, cf. also FIG. 3, in which the locking mechanism 37 still assumes the locked state, but yet allows easy passing of the seat arrangement 1. In order to reach the intermediate position of the pad portion 11, the protruding pin 63 at the first end 61 of the first link arm 55 has been displaced by sliding in the guiding arcuate slot 59. The first link arm 55 and the components of the locking mechanism 37 being located below have yet not moved. The length of the slot 59 determines the maximum angle about which the pad portion 11 may be rotated, before beginning transiting to the unlocked state, here corresponding to a 65° rotation.

In the locked state of the locking mechanism 37, corresponding to the use position of the armrest 9 with the pad portion 11 being horizontal or substantially horizontal, and during the rotation of the pad portion 11 to the intermediate position, the locking pin 43 is held in the first indentation 49 of the locking member 45 by means of the first biasing means, i.e. the springs 47a, 47b, see FIG. 10, showing details of the armrest 9 of FIG. 9 from another perspective.

In order to facilitate rotation of the arm portion 13 of the armrest 9, the locking pin 43 is to be moved out of the first indentation 49 against the force of the first biasing means 47a, 47b. When the pad portion 11 is rotated the remaining angle from the intermediate position, the remaining angle here being at about 25°, to the first maximum rotation angle $\alpha_{max}$, being about 90° and described above in conjunction with FIG. 2, the protruding pin 63 has already reached the end of the slot 59 and therefore moves together with the pad portion 11 during its rotation, see FIG. 11. Accordingly, the first link arm 55 including the first pivot axis P1 is moved upwards and the second link arm 57 rotates around the third pivot axis P3. This causes the unlock sliders 71a, 71b to move downwards via rotation about the second pivot axis P2 and sliding in the elongated hole. Eventually, the unlock sliders 71a, 71b reach the locking pin 43 and push the locking pin 43 in a direction away from the locking member 45, see FIG. 12, and thereby out of the first indentation 49. The locking mechanism 37 then assumes its unlocked state. Thereafter, the arm portion 13 is free to rotate.

Due to the rounded outer surface profile of the locking member 45 between the first and second indentations 49, 51, the locking member 45 may rotate together with the arm portion 13 even though the locking pin 43 presses against the locking member 45.

When the locking pin 43 reaches the second indentation 51, a movement resulting from the rotation of the locking member 45 together with the arm portion 13, the locking pin 43 will enter the second indentation 51 due to the force from the first biasing means 47a, 47b. This is possible since the unlock sliders 71a, 71b have been moved away from the locking pin 43 by the pad portion 11 being rotated away from the first maximum rotation angle $\alpha_{max}$ to the intermediate position. The protruding pin 63 moves in the slot 59, thereby influencing the first link arm 55, the second link arm 57 and the unlock sliders 71a, 71b by means of the pivot axes P1, P2, P3.

Figure 13:
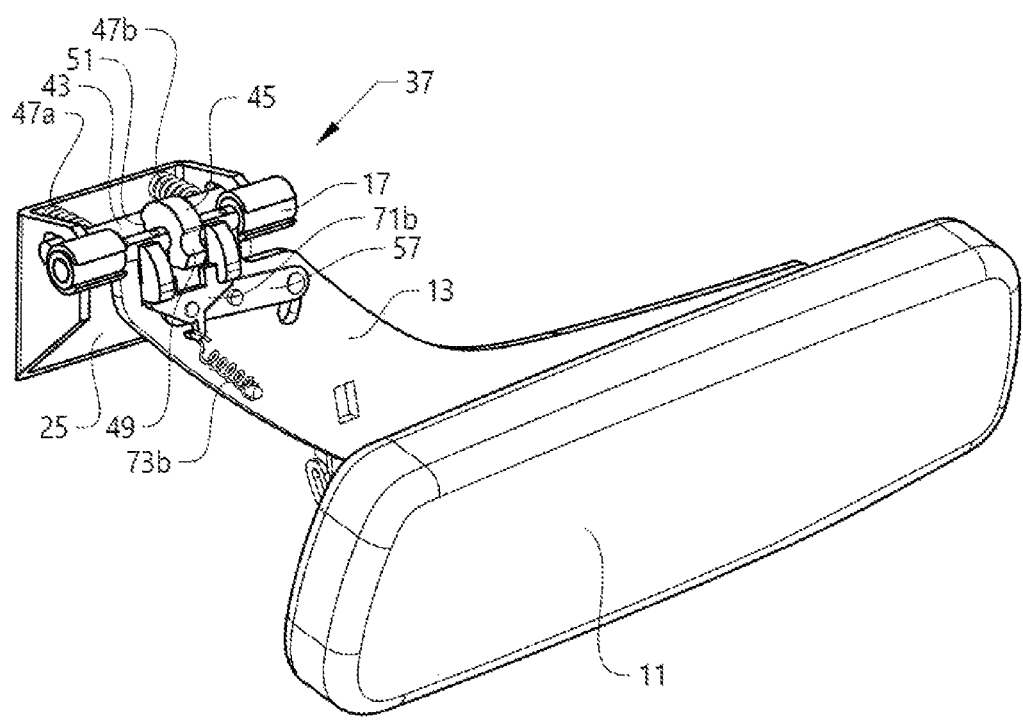
FIG. 13 illustrates the armrest in the fold-away position showing the locking mechanism in the locked state.

In the fold-away position of the armrest 9, see FIG. 13, the pad portion 11 is held in the intermediate position by being biased by the second biasing means 73a, 73b. Hence, the locking mechanism 37 is in its locked state.

To unlock the locking mechanism 37 when in the fold-away position of the armrest 9, the pad portion 11 is rotated to the first maximum rotation angle $\alpha_{max}$ being about 90 degrees and the locking pin 43 is moved out of the second indentation 51 of the locking member 45 in a corresponding way as described above for the first indentation 49.

The described locking mechanism 37 represents one way of locking and unlocking the armrest 9. Alternatively, a release button or a pull strap may be provided for locking and unlocking the armrest 9.

As a further alternative, the armrest may be biased towards the use position and the fold-away position, respectively. In that case there would be no firm locked state of the locking mechanism. Instead, an increased force would be used to displace the armrest from the use position and the fold-away position, respectively.

It would also be possible to perform the transition of the armrest between the use position and the fold-away position electrically.

Figure 14:
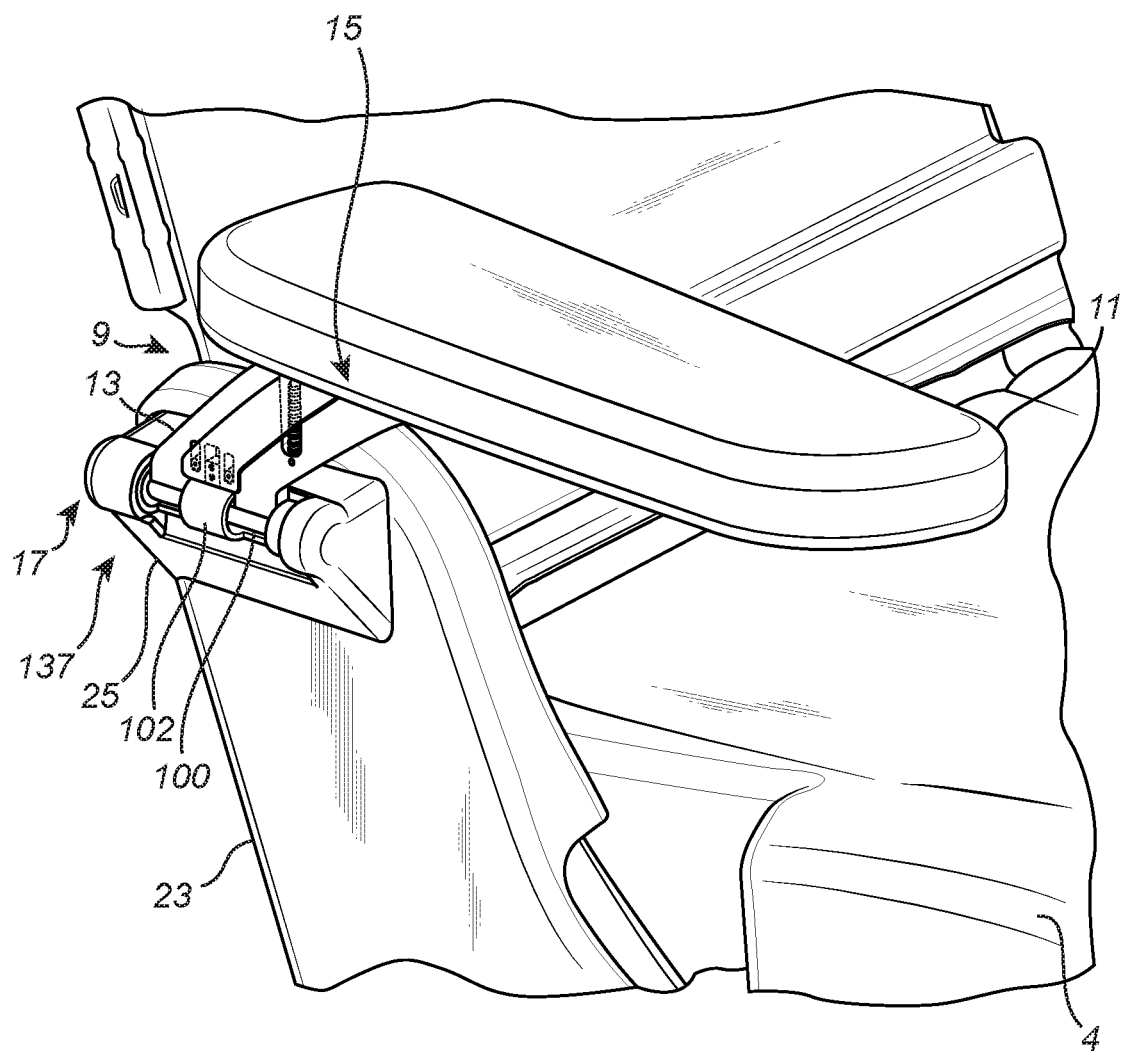
FIG. 14 illustrates another exemplary embodiment of the locking mechanism of the present disclosure, with the armrest in an upright, locked state, with the cover component(s) removed.

Referring now specifically to FIG. 14, in another exemplary embodiment, the locking mechanism 137 again provides a means by which the armrest 9 is locked in and selectively rotated from an upright, deployed configuration to a downwards, collapsed configuration, with optional detent configurations in between. The armrest 9 again includes an arm portion 13 and a pivotably coupled pad portion 11. The arm portion 13 is pivotably coupled to the hinge bracket 25 or the like that is coupled to the recliner bracket 23 or the like that forms part of the seat 4. The arm portion 13 is pivotably coupled to the hinge bracket 25 or the like along the second hinge 17, which, in the illustrated embodiment, includes an elongate rod 100 that is rotatably disposed within a tube 102 affixed between the opposed flange portions of the hinge bracket 25. This tube 102 includes cut-outs through which the arm portion 13 is affixed to the elongate rod 100, allowing the arm portion 13 to selectively pivot with respect to the tube 102, hinge bracket 25, and recliner bracket 23 along with the elongate rod 100. The pad portion 11 is pivotably attached to the opposite end of the arm portion 13, again along the first hinge 15, which may consist of an elongate piano hinge or the like. As illustrated, the hinge bracket 25 and the recliner bracket 23 may be integrally formed, with the tube 102 fixedly disposed between the opposed flanges of the hinge bracket 25, although the configuration is not strictly necessary, provided that the relative rotations described are enabled. The locking mechanism 137 provides a means by which the armrest is locked within and released from various configurations with respect to the seat 4, and is again actuated by rotation of the pad portion 11, the pressing of a button release, the pulling of a strap release, etc. All portions of the locking mechanism 137 are preferably covered by appropriate cover members such that they are hidden from view and safeguarded from contact by a user, etc.

Figure 15:
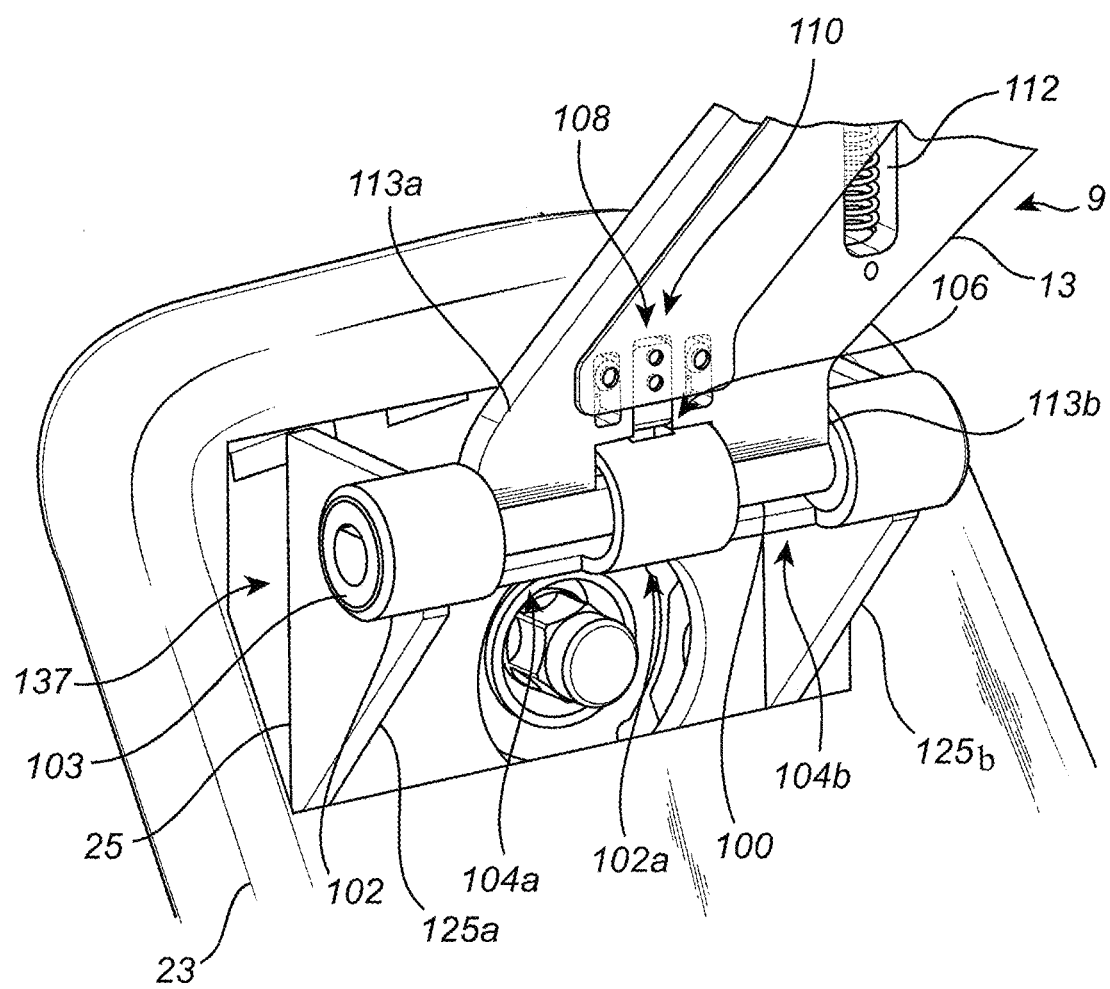
FIG. 15 illustrates the locking mechanism in greater detail, again with the armrest in an upright, locked state, with the cover component(s) removed.

Referring to FIG. 15, the locking mechanism 137 is more clearly illustrated. Here, the hinge bracket 25 is bolted or otherwise secured to the recliner bracket 23 or the like. The tube 102 is rigidly coupled to the hinge bracket 25, spanning the gap formed between the opposed flange portions 125a and 125b of the hinge bracket 25. Alternatively, the tube 102 may be rigidly coupled directly to or integrally formed with the recliner bracket 23 or the like. The elongate rod 100 is rotatably held within the tube 102 and allows the coupled arm portion 13 of the armrest 9 to pivot with respect to the recliner bracket 23 or the like. For this, purpose, an annular bushing 103 is provided in each end of the tube 102 to rotatably secure the elongate rod 100 within the tube 102. As provided above, the arm portion 13 includes one or more attachment portions 113a and 113b that pass through corresponding substantially circumferential cut-outs 104a and 104b manufactured into the tube 102, allowing for this rotation/pivoting.

As illustrated, the tube 102 includes a central portion 102a that defines a plurality of longitudinal notches 106a around the circumference thereof, substantially corresponding to at least the locked, upright and collapsed positions of the arm portion 13 of the armrest 9. These notches 106a act as detent or locking positions for the arm portion 13. The notches 106a are selectively engaged by a tab structure 108 that translates along a slot 110 manufactured into the arm portion 13, selectively protruding from and retracting into the arm portion 13. This tab/notch engagement stops rotation of the elongate rod 100 within the tube 102 and locks the arm portion 13 with respect to the tube 102, and the hinge bracket 25 and recliner bracket 23, at the predetermined locking positions. Alternatively, a friction locking mechanism can be used, providing a more continuous spectrum of locking positions. As alluded to above, the tab structure 108 may be spring-loaded and biased into a locking configuration via a spring 112 or the like and selectively released via the actuation of a button or strap release that protrudes through the housing of the arm portion 13, for example. Such actuation may also be provided via rotation of a portion of the armrest 9 itself, as provided below.

Figure 16:
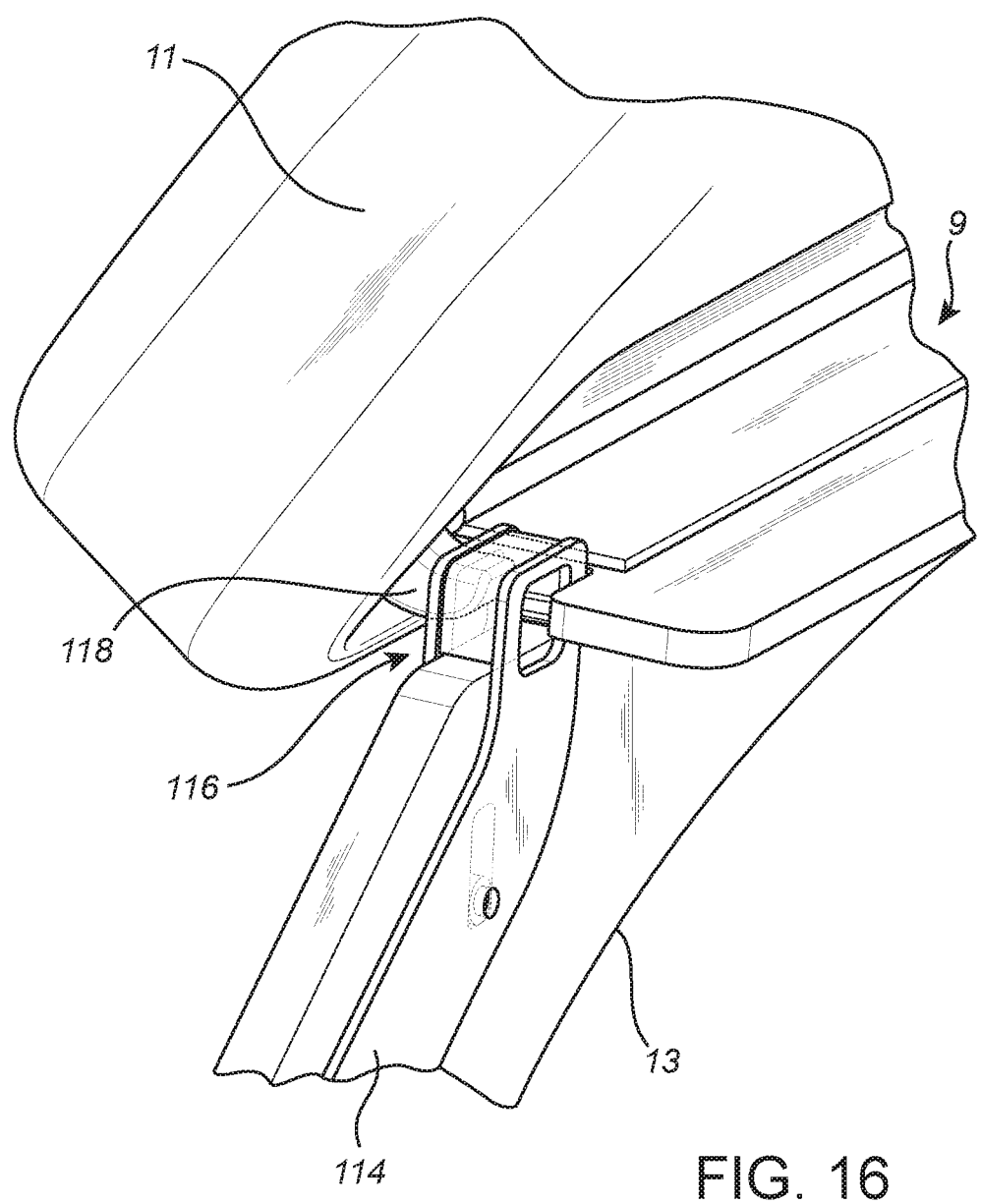
FIG. 16 illustrates the operation of the locking mechanism release associated with pivoting of the pad.

Referring now specifically to FIG. 16, the actuation of the tab structure 108 (FIG. 15) may be accomplished via the translation of a strut member 114 within the arm portion 13. Opposite the tab structure 108, the strut member 114 terminates in a receptacle structure 116 that is engaged and pulled by a hook structure 118 when the pad portion 11 of the armrest 9 is pivoted along the first hinge 15, and specifically to bring the pad portion 11 into parallel alignment with the arm portion 13. This pulling of the hook structure 118 pulls the receptacle structure 116 and the strut member 114, retracting the tab structure 108 into the arm portion 13, withdrawing it from the respective notch 106 (FIG. 15) and unlocking rotation of the arm portion 13 with respect to the tube 102 (FIGS. 14 and 15). This process is reversed to again lock the armrest 9. As provided, the tab structure 108 may be biased into a locked configuration, which bias is overcome by rotation of the pad portion 11.

Figure 17:
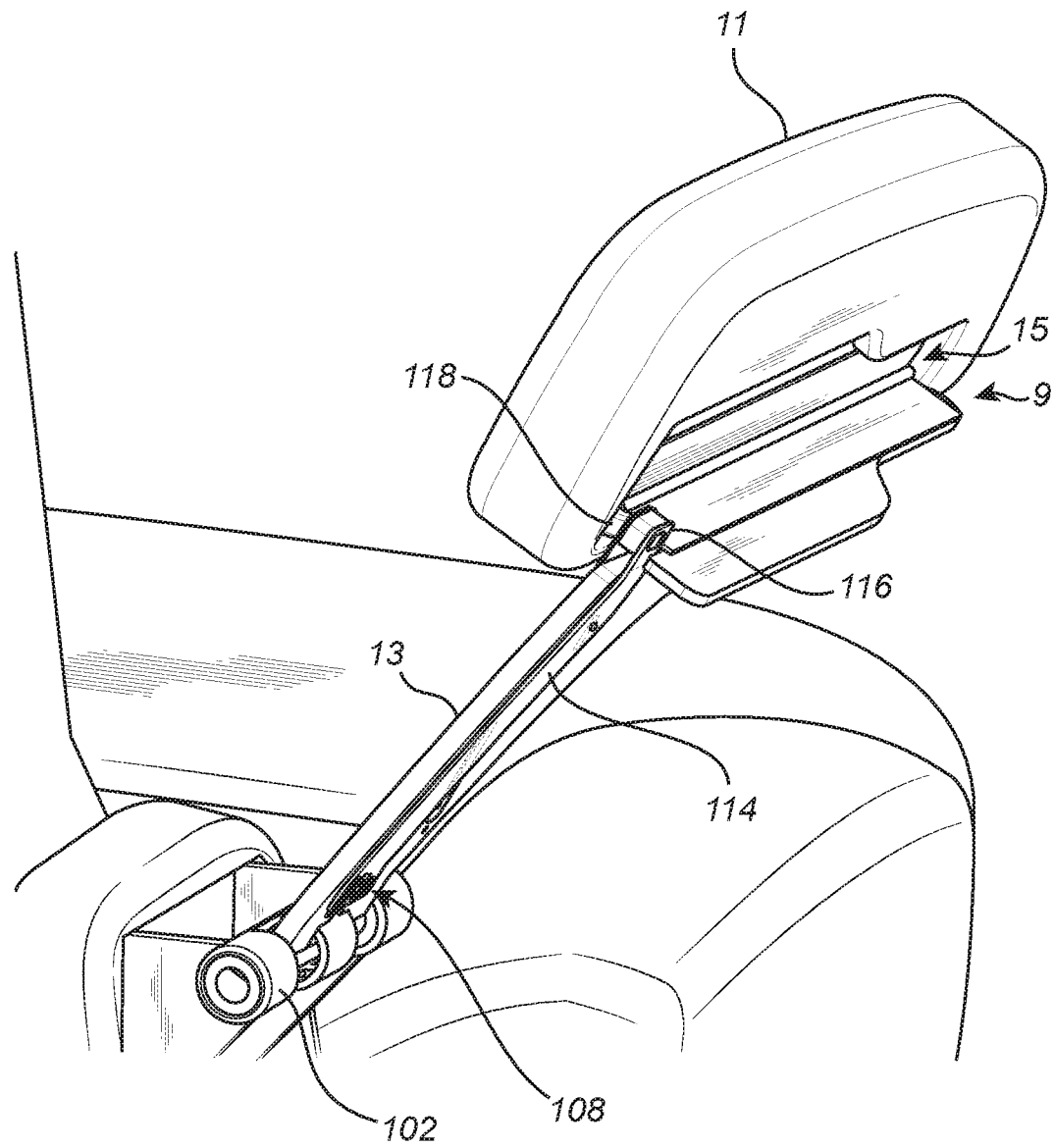
FIG. 17 illustrates the locking mechanism, with the armrest in an unlocked, partially-pivoted state.

FIG. 17 again illustrates that, opposite the tab structure 108, the strut member 114 terminates in the receptacle structure 116 that is engaged and pulled by the hook structure 118 when the pad portion 11 of the armrest 9 is pivoted along the first hinge 15, and specifically to bring the pad portion 11 into parallel alignment with the arm portion 13. This pulling of the hook structure 118 pulls the receptacle structure 116 and the strut member 114, retracting the tab structure 108 into the arm portion 13, withdrawing it from the respective notch 106 (FIG. 15) and unlocking rotation of the arm portion 13 with respect to the tube 102. This process is reversed to again lock the armrest 9. It should be noted that other suitable mechanisms for translating the strut member 114 within the arm portion 13 and retracting the tab structure 108 from the current notch 106 may be utilized equally.

Figure 18:
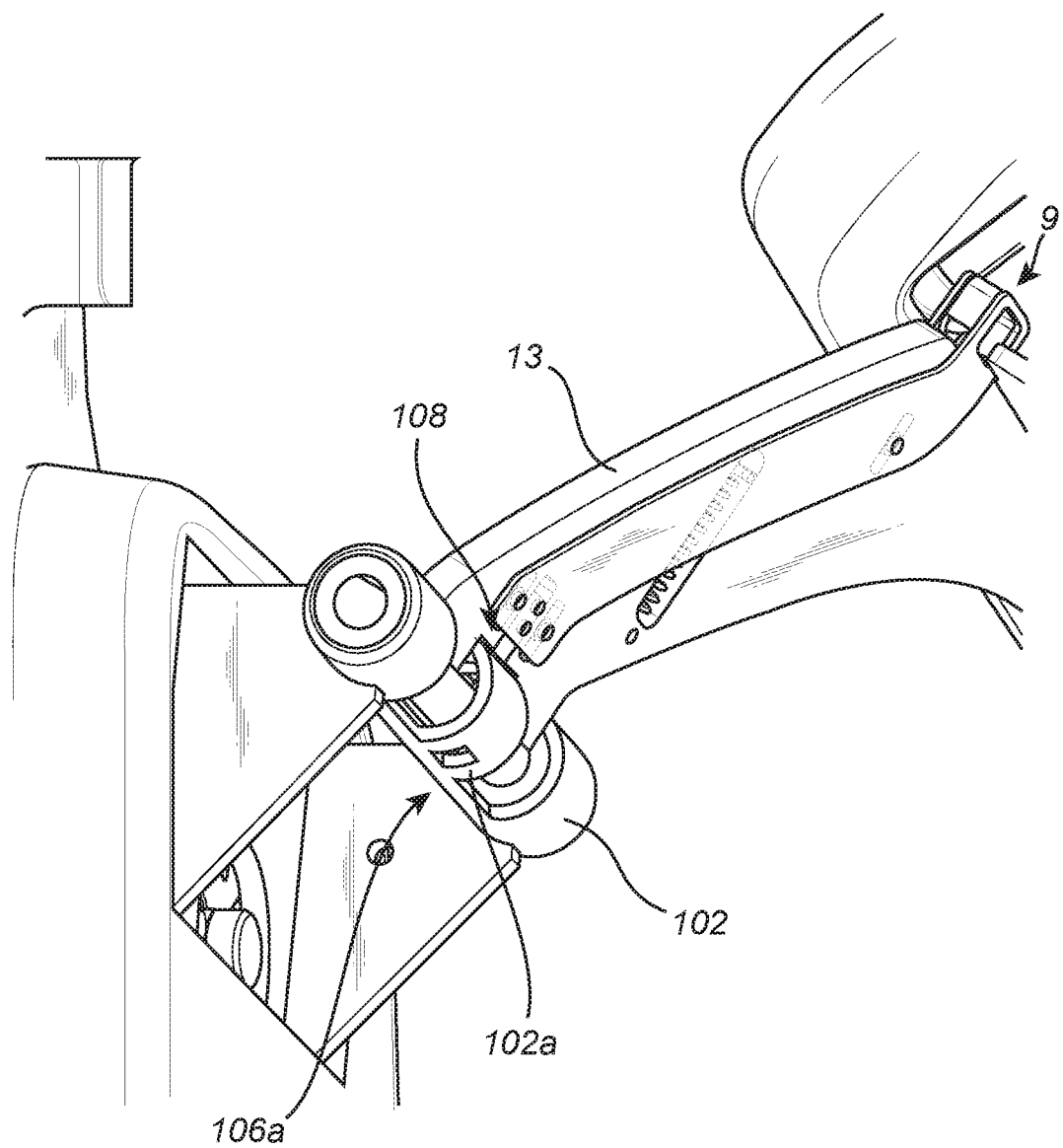
FIG. 18 illustrates the locking mechanism in greater detail, again with the armrest in an unlocked, partially-pivoted state.

FIG. 18 illustrates the lower notch 106a that is formed in the bottom portion of the central portion 102a of the tube 102, which is selectively engaged by the tab structure 108, thereby providing a locking position for the arm portion 13 when the armrest 9 is disposed in a downwards, collapsed configuration. Again, such notches may be provided at various points about the tube 102 to provide various secure stopping points for the arm portion 13 when actuated.

Figure 19:
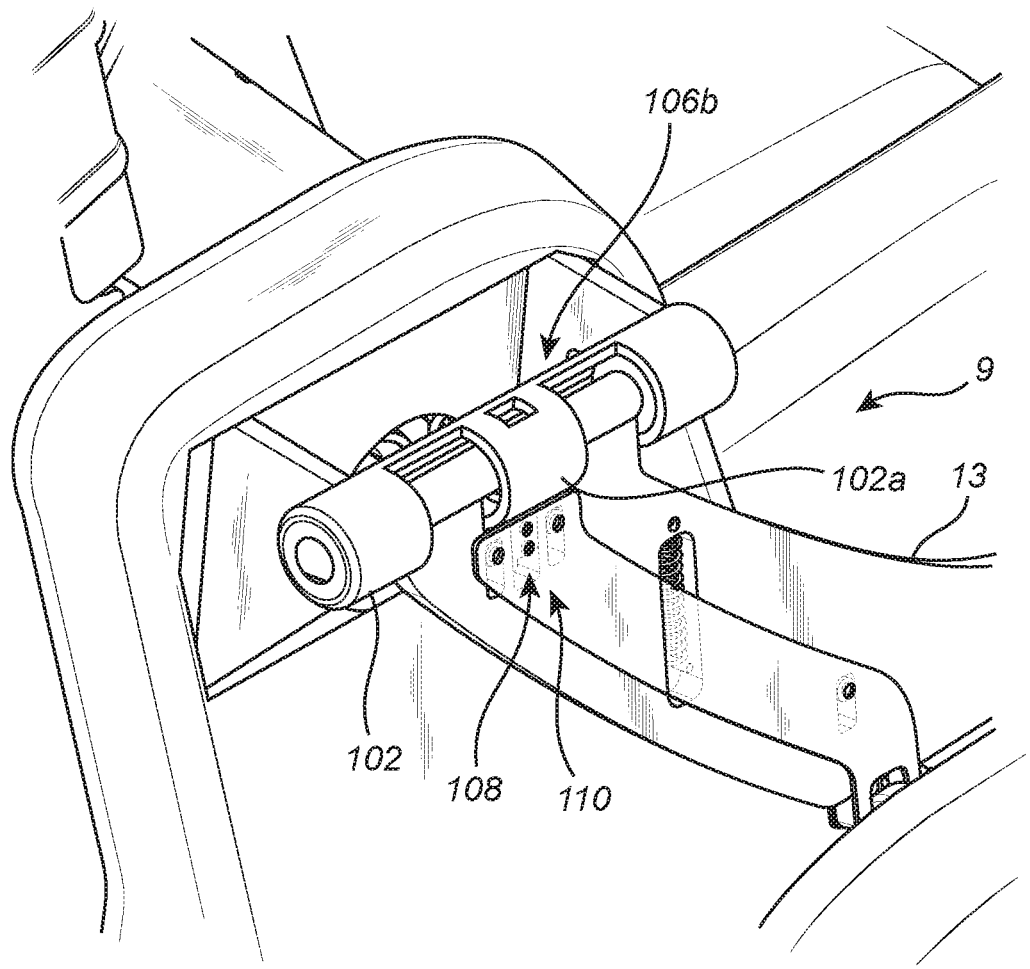
FIG. 19 illustrates the locking mechanism in greater detail, with the armrest in a collapsed, locked state.

FIG. 19 illustrates the upper notch 106b that is formed in the top portion of the central portion 102a of the tube 102, which is selectively engaged by the tab structure 108, thereby providing a locking position for the arm portion 13 when the armrest 9 is disposed in an upright, deployed configuration. Again, such notches may be provided at various points about the tube 102 to provide various secure stopping points for the arm portion 13 when actuated. A good view of the translation of the tab structure 108 within the slot 110 is also illustrated.

With reference to FIGS. 14-19, the armrest 9 is originally locked in the upright use position, with the locking mechanism 137 covered by appropriate cover structures manufactured from a rigid plastic material or the like. The arm portion 13 is then unlocked by the user by pivoting the pad portion 11 of the armrest 9, or by actuating a button or strap release, thereby releasing the tab structure 108 from the associated notch 108 of the central portion 102a of the tube 102. This allows for rotation of the arm portion 13 with respect to the tube 102, hinge bracket 25, and associated recliner bracket 25 along the second hinge 17. When the pad portion 11 is rotated along the first hinge 15, the hook structure 118 generally translates the receptacle structure 116 and the strut member 114, thereby translating the tab structure 108 within the slot 110 of the arm portion 13. The armrest 9 may then be rotated to its stowed configuration and locked in a similar manner. This simplified locking mechanism 137 provides a simple and inexpensive assembly that is not problematic to cover as all moving parts are essentially disposed within the arm portion 13 of the armrest 9.

Further modifications of the disclosure within the scope of the appended claims are feasible. As such, the present disclosure should not be considered as limited by the embodiments and figures described herein. Rather, the full scope of the disclosure should be determined by the appended claims, with reference to the description and drawings.

What is claimed is:

1. An armrest assembly for use with a seat of a vehicle, the armrest assembly comprising:
a pad portion adapted to support a forearm of a user when the armrest assembly is disposed in an upright use configuration adjacent to the seat;
an arm portion coupled to the pad portion at one end and a structure of the seat at an opposite end and adapted to pivot from the upright use configuration to a collapsed stowed configuration adjacent to the seat along a hinge with the structure of the seat; and
a locking mechanism coupled between the arm portion and the structure of the seat and adapted to selectively prevent pivoting of the arm portion and secure the arm portion in one or more of the upright use configuration and the collapsed stowed configuration adjacent to the seat;
wherein the locking mechanism comprises:
a tube structure coupled to the structure of the seat and defining one or more circumferential notches about an exterior surface thereof;
an elongate rod coupled to the opposite end of the arm portion and at least partially disposed rotatably within the tube structure; and
a tab structure adapted to selectively protrude from the opposite end of the arm portion and engage one of the one or more notches of the tube structure to selectively secure the arm portion in the one or more of the upright use configuration and the collapsed stowed configuration adjacent to the seat.

2. The arm rest assembly of claim 1, wherein the structure of the seat comprises one or more of a hinge bracket and a recliner bracket adapted to be coupled to or integrally formed with the seat.

3. The arm rest assembly of claim 1, wherein the locking mechanism further comprises one or more bushings disposed concentrically between the tube structure and the elongate rod and adapted to facilitate relative rotation of the elongate rod within the tube structure.

4. The armrest assembly of claim 1, wherein the locking mechanism further comprises a strut member coupled to the tab structure and adapted to be selectively translated within the arm portion, thereby selectively extending the tab structure from and/or withdrawing the tab structure into the opposite end of the arm portion and the one or more circumferential notches.

5. The armrest assembly of claim 4, wherein the strut member is coupled to the pad portion at the one end of the arm portion and adapted to be selectively translated within the arm portion via selective pivoting of the pad portion with respect to the arm portion along an intervening hinge.

6. The armrest assembly of claim 1, wherein the tab structure is biased to protrude from the opposite end of the arm portion by a spring member disposed within or coupled to the arm portion.

7. The armrest assembly of claim 1, wherein the one or more circumferential notches are disposed about the exterior surface of a central portion of the tube structure.

8. The armrest assembly of claim 7, wherein the tube structure defines one or more partially-circumferential cut-outs through which one or more connecting structures couple the arm portion to the elongate rod through the tube structure.

9. A locking mechanism for an armrest assembly for use with a seat of a vehicle, the locking mechanism comprising:
an arm portion adapted to be coupled to a pad portion at one end and a structure of the seat at an opposite end and to pivot from an upright use configuration to a collapsed stowed configuration adjacent to the seat along a hinge with the structure of the seat;
a tube structure adapted to be coupled to the structure of the seat and defining one or more circumferential notches about an exterior surface thereof;
an elongate rod coupled to the opposite end of the arm portion and at least partially disposed rotatably within the tube structure; and
a tab structure adapted to selectively protrude from the opposite end of the arm portion and engage one of the one or more notches of the tube structure to selectively secure the arm portion in the one or more of the upright use configuration and the collapsed stowed configuration adjacent to the seat;
wherein the locking mechanism is adapted to selectively prevent pivoting of the armrest assembly with respect to the structure of the seat along the hinge and secure the armrest assembly in one or more of the upright use configuration and the collapsed stowed configuration adjacent to the seat.

10. The locking mechanism of claim 9, wherein the pad portion is adapted to support a forearm of a user when the armrest assembly is disposed in the upright use configuration adjacent to the seat.

11. The locking mechanism of claim 9, further comprising a hinge bracket coupled to the tube structure and adapted to be coupled to a recliner bracket adapted to be coupled to or integrally formed with the seat.

12. The locking mechanism of claim 9, further comprising one or more bushings disposed concentrically between the tube structure and the elongate rod and adapted to facilitate relative rotation of the elongate rod within the tube structure.

13. The locking mechanism of claim 9, further comprising a strut member coupled to the tab structure and adapted to be selectively translated within the arm portion, thereby selectively extending the tab structure from and/or withdrawing the tab structure into the opposite end of the arm portion and the one or more circumferential notches.

14. The locking mechanism of claim 13, wherein the strut member is adapted to be coupled to the pad portion at the one end of the arm portion and selectively translated within the arm portion via selective pivoting of the pad portion with respect to the arm portion along an intervening hinge.

15. The locking mechanism of claim 9, wherein the tab structure is biased to protrude from the opposite end of the arm portion by a spring member disposed within or coupled to the arm portion.

16. The locking mechanism of claim 9, wherein the one or more circumferential notches are disposed about the exterior surface of a central portion of the tube structure.

17. The locking mechanism of claim 16, wherein the tube structure defines one or more partially-circumferential cut-outs through which one or more connecting structures couple the arm portion to the elongate rod through the tube structure.

* * * * *